(12) United States Patent
Gerasopoulos et al.

(10) Patent No.: US 11,387,488 B2
(45) Date of Patent: Jul. 12, 2022

(54) GEL POLYMER ELECTROLYTE COMPOSITIONS AND ELECTROCHEMICAL CELLS INCLUDING THE SAME

(71) Applicant: The Johns Hopkins University, Baltimore, MD (US)

(72) Inventors: Konstantinos Gerasopoulos, Odenton, MD (US); Adam W. Freeman, Laurel, MD (US); Christopher M. Hoffman, Jr., Odenton, MD (US)

(73) Assignee: The Johns Hopkins University, Baltimore, MD (US)

(*) Notice: Subject to any disclaimer, the term of this patent is extended or adjusted under 35 U.S.C. 154(b) by 432 days.

(21) Appl. No.: 16/054,282

(22) Filed: Aug. 3, 2018

(65) Prior Publication Data

US 2019/0237803 A1     Aug. 1, 2019

Related U.S. Application Data

(60) Provisional application No. 62/622,203, filed on Jan. 26, 2018.

(51) Int. Cl.
*H01M 10/0565* (2010.01)
*H01M 10/058* (2010.01)
*H01M 10/0525* (2010.01)

(52) U.S. Cl.
CPC ..... *H01M 10/0565* (2013.01); *H01M 10/058* (2013.01); *H01M 10/0525* (2013.01); *H01M 2300/0002* (2013.01); *H01M 2300/0082* (2013.01); *H01M 2300/0085* (2013.01)

(58) Field of Classification Search
CPC ................... H01M 2300/085; H01M 4/0407
See application file for complete search history.

(56) References Cited

U.S. PATENT DOCUMENTS

| | | | | |
|---|---|---|---|---|
| 5,593,795 A | * | 1/1997 | Chen | C08G 65/329 429/313 |
| 2004/0185330 A1 | * | 9/2004 | Yamaguchi | H01M 10/0525 429/59 |
| 2009/0087730 A1 | * | 4/2009 | Kondo | H01M 2/266 429/161 |
| 2015/0349310 A1 | * | 12/2015 | Viner | H01M 4/134 429/126 |

OTHER PUBLICATIONS

U.S. Appl. No. 16/376,073, filed Apr. 5, 2019, Gerasopoulos et al..

(Continued)

*Primary Examiner* — Maria Laios
(74) *Attorney, Agent, or Firm* — Sung T. Kim

(57) ABSTRACT

Gel polymer electrolyte compositions including a cross-linked three-dimensional polymer network and an electrolyte composition comprising an electrolyte and water are provided. The gel polymer electrolyte compositions can be included in an aqueous electrochemical cell, in which a gel polymer electrolyte can be positioned between an anode and a cathode. Methods of forming a gel polymer electrolyte in the form of a film are also provided. Methods of forming an aqueous electrochemical cell including a gel polymer electrolyte are also provided.

15 Claims, 13 Drawing Sheets

(56) References Cited

OTHER PUBLICATIONS

U.S. Appl. No. 16/559,709, filed Sep. 4, 2019, Gerasopoulos et al..
U.S. Appl. No. 16/558,044, filed Aug. 31, 2019, Freeman et al..
U.S. Appl. No. 16/859,057, filed Apr. 27, 2020, Gerasopoulos et al..
U.S. Appl. No. 17/380,527, filed Jul. 20, 2021, Gerasopoulos et al..

* cited by examiner

GEL POLYMER ELECTROLYTE COMPOSITIONS AND ELECTROCHEMICAL CELLS INCLUDING THE SAME

PRIORITY CLAIM

This application claims priority under 35 U.S.C. § 119(e) to U.S. Provisional Application Ser. No. 62/622,203, filed on Jan. 26, 2018, which is expressly incorporated by reference herein in its entirety.

TECHNICAL FIELD

Embodiments of the presently-disclosed invention relate generally to gel polymer electrolyte compositions and electrochemical cells (e.g., aqueous electrochemical cells) including the same. Embodiments of the presently-disclosed invention also generally relate to electrochemical cells (e.g., aqueous electrochemical cells) including one or more electrodes including a gel polymer electrolyte or derivative thereof as a component (e.g., as a binder) forming the electrode.

BACKGROUND

The majority of today's rechargeable batteries are based on lithium-ion chemistry. While lithium-ion batteries possess the highest energy density among rechargeable systems, they suffer from safety concerns. A prominent safety concern is related to the organic electrolyte utilized in such batteries. The combination of the organic electrolyte, which is flammable, with an oxygen-rich cathode can cause or be vulnerable to a thermal runaway that can lead to fire and explosion. As a result, lithium-ion batteries require very stringent packaging and thermal management systems to ensure safety. These management systems add a significant and undesirable weight to the battery and unavoidably limit lithium-ion battery architectures to rigid form factors (e.g., rigid casings, etc.). However, several commercial applications including autonomous systems, portable expeditionary power, and/or wearable/biomedical sensors require flexible, lightweight, and safe batteries that do not sacrifice energy density.

SUMMARY OF INVENTION

Certain embodiments according to the invention provide gel polymer electrolyte ("GPE") compositions including a cross-linked three-dimensional polymer network and an electrolyte composition comprising an electrolyte and water.

In another aspect, embodiments of the present invention provide electrochemical cells (e.g., aqueous-based electrochemical cell) including an anode, a cathode, and a GPE positioned between and in contact with the anode and the cathode. The GPE may include a GPE-composition comprising (a) a cross-linked three-dimensional polymer network and (b) an electrolyte composition absorbed by the GPE, in which the electrolyte composition comprises an electrolyte and water.

In another aspect, embodiments of the present invention provide methods of forming a GPE. Such methods, for instance, may include radically-curing an aqueous composition of a mixture of monomers in, for example, an oxygen-containing environment.

In another aspect, embodiments of the present invention provide methods of forming an electrochemical cell. The methods may include depositing a GPE between and in contact with an anode and a cathode. Depositing the GPE may comprise positioning a pre-fabricated GPE between the anode and the cathode or forming the GPE directly onto the anode, the cathode, or both.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein:

FIGS. 9A and 9B shows that an example electrochemical cell exhibited extended cycling, in which FIG. 9A shows the $63^{rd}$ cycle and FIG. 9B shows the capacity vs. cycle life;

DETAILED DESCRIPTION

Figure 1:
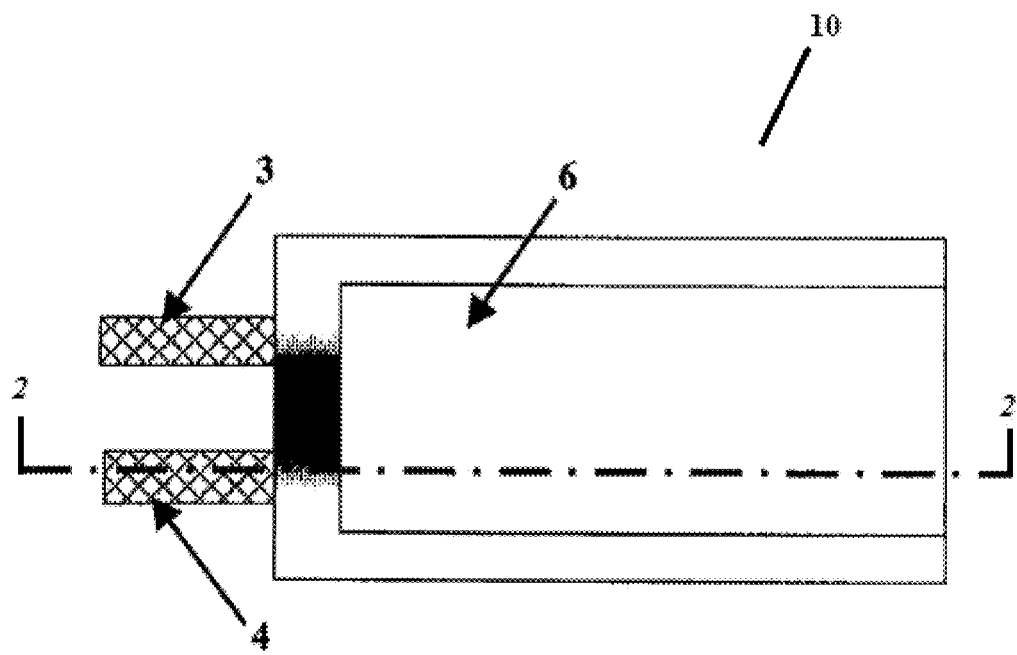
FIG. 1 illustrates an electrochemical cell according to certain embodiments of the invention.

Embodiments of the invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Aqueous-based electrolyte systems suitable for use in a variety of electrochemical cells may significantly reduce or mitigate the risk of thermal runaways leading to undesirable fires and explosions. Aqueous-based electrolyte systems suitable for use in a variety of flexible (e.g., non-rigid) electrochemical cells may be flexed or bent on an as-needed basis during or prior to operation. Electrochemical cells (e.g., aqueous electrochemical cells) including a gel polymer electrolyte may continue to function after severe trauma or abuse (e.g., puncturing, cutting, etc.) to the electrochemical cell.

The present description relates generally to gel polymer electrolyte compositions and electrochemical cells (e.g., aqueous electrochemical cells) including the same. Embodiments of the presently-disclosed invention also generally relate to electrochemical cells (e.g., aqueous electrochemical cells), in which at least one of the electrodes includes a gel polymer electrolyte-composition or derivative thereof as a component (e.g., as a binder) forming the electrode. In accordance with certain embodiments, the present invention enables the replacement of flammable organic liquid electrolyte with a polymeric water-based alternative, in which the gel polymer electrolyte ("GPE") composition may be cured into three-dimensional cross-linked polymer films that are flexible, stretchable, and/or possess excellent adhesion (e.g., tackiness that may adhere to surfaces upon the application of pressure). In accordance with certain embodiments of the invention, the three-dimensional cross-linked polymer films (e.g., a GPE) may be characterized as a hydrogel (e.g. a cross-linked three-dimensional hydrophilic polymer network/matrix in which an aqueous composition may be absorbed therein), in which the GPE may contain aqueous-based salts to achieve high ionic conductivity. In accordance with certain embodiments of the invention, the GPE-compositions may be formed (e.g., radically-cured in to the form of a GPE for use in an electrochemical cell) in an open environment in the presence of oxygen, or between transparent substrates (e.g. glass or plastic) with spacers, as a route to thin films with controllable film thicknesses. In this regard, certain embodiments of the present invention enable the production of safe electrochemical cells (e.g., aqueous electrochemical cells) that may be provided in a variety of configurations (e.g., rigidity, size, voltage operating window, etc.). For instance, GPEs and electrochemical cells including GPEs in accordance with certain embodiments of the invention may be incorporated into, for example, wearable sensors, implantable devices, electric vehicles, batteries, sensors, capacitors, structurally-flexible electronics, and other energy storage devices.

In one aspect, certain embodiments according to the invention provide GPE-compositions including a cross-linked three-dimensional polymer network and an electrolyte composition comprising an electrolyte and water. In this regard, the GPE-composition may comprise a cross-linked three-dimensional network in the form of a hydrogel that retains an electrolyte solution. The three-dimensional polymer network may be formed or defined by a reaction product of a variety of substantially water soluble monomers. In accordance with certain embodiments of the invention, the chemistry for forming the GPE-compositions may be based upon the radically mediated addition of thiols to olefins (thiol-ene/thiol-yne/hydrothiolation), which may be used to make three-dimensional cross-linked networks when monomers possessing two or more thiols are reacted with other olefinic monomers possessing two or more vinyl or alkyne functional groups (e.g., monomers including at least two double bonds, at least one triple bond, or a combination thereof), in which the total of the (i) vinyl and/or alkyne functional groups and (ii) thiol functional groups across the combination of monomers is greater than or equal to five. In this regard, it is important to understand that in this context each vinyl functionality (e.g., allyl, vinylether, (meth)acrylate, norbornene, etc.) can react with one thiol, and is thus considered monofunctional, whereas each alkyne is capable reacting with two thiols, and is thus considered difunctional. In accordance with certain embodiments of the invention, the properties of the network can be tuned by the structure, functionality, and stoichiometry of two or more monomers used to form the three-dimensional polymeric network or matrix. Although not limited to photo-initiated curing processes, the thiol-based chemistry enables several advantages for curing/reacting the monomers by a photo-initiated process (e.g., UV curing process), which may include the advantages of a simple set-up, fast kinetics, and the ability of make thin film form factors (e.g., GPE in the form of a uniform film). Additionally, certain embodiments of the invention utilizing the thiol-based chemistry as disclosed herein beneficially overcomes the inherent oxygen inhibition of radically-cured films/gels. For instance, the use of thiol-ene-based chemistry in accordance with certain embodiments of the invention enables ultra-fast cross-linking in open air (e.g., in the presence of oxygen), which is particularly desirable considering that conventional aqueous polymer electrolytes require cross-linking in inert environments because oxygen gas can inhibit polymerization.

In accordance with certain embodiments of the invention, a substantially water soluble monomer may be defined by (i) an actual or calculated water solubility, (ii) a log(P) value, or (iii) a combination thereof. The individual monomers reacted to form the three-dimensional polymer network may be soluble (actual or calculated as noted below) in water at 25° C. from at least about any of the following: 10, 15, 20, 25, 30, 35, 40, 50, 60, 70, 80, 90, 100, and 110 g/L (actual or calculated as noted below) and/or at most about 250, 225, 200, 190, 180, 170, 160, 150, 140, 130, 120, and 110 g/L (actual or calculated as noted below). In accordance with certain embodiments of the invention, one or more (e.g., all) of the monomers are completely miscible with water in all proportions. In accordance with certain embodiments of the invention, the combination of monomers may be soluble in water at 25° C. from at least about any of the following: 40, 50, 60, 70, 80, 90, 100, and 110 g/L (actual or calculated as noted below) and/or at most about 250, 225, 200, 190, 180, 170, 160, 150, 140, 130, 120, and 110 g/L (actual or calculated as noted below). In accordance with certain embodiments of the invention, the combination of all monomers are completely miscible with water in all proportions. Additionally or alternatively, the water solubility of the substantially water soluble monomers may have or be characterized, at least in part, by the logarithm of an octanol-water partition coefficient (P) of the individual monomers and/or the weighted average of all of the monomers reacted to form the three-dimensional polymer network. Log(P), or the octanol-water partition coefficient is a physical property used extensively to describe a chemical's lipophilic or hydrophobic properties. Log(P) is the ratio of a chemical's concentration in the octanol-phase to its concentration in the aqueous phase of a two-phase system at equilibrium. Since measured values of 'P' range from less than $10^{-4}$ to greater than $10^{+8}$ (at least 12 orders of magnitude), the logarithm (log P) is commonly used to characterize its value. Log(P) is a valuable parameter in numerous quantitative structure-activity relationships (QSAR). In this regard, for instance, the water solubility of the substantially water soluble monomers may be defined by the log(P) value of the individual monomers and/or the weighted average of the monomers. In accordance with certain embodiments, the individual monomers and/or the weighted average of all of the monomers may have a value of 4.0 or less (e.g., 3.0 or less, 2.0 or less, 1.0, or less, or less than 0.0). For example, the individual monomers reacted to form the three-dimensional polymer network may comprise a log(P) value of at most about any of the following: 4.0, 3.5, 3.0, 2.5, 2.0, 1.5, and 1.0 and/or at least about −2.0, −1.5, −1.0, −0.5, 0.0, 0.5, and 1.0. In accordance with certain embodiments, the weighted average of the monomers reacted to form the three-dimensional polymer network may comprise a log(P) value of at most about any of the following: 4.0, 3.5, 3.0, 2.5, 2.0, 1.5, and 1.0 and/or at least about −2.0, −1.5, −1.0, −0.5, 0.0, 0.5, and 1.0. In this regard, the determination of the log(P) for the weighted average of the monomers reacted to form the three-dimensional polymer network may be determined by general Equation (1):

$$\log(P)_{weighted\ average} = X^*[\log(P)_1] + Y^*[\log(P)_2] + Z^*[\log(P)_3] \quad \text{Equation (1);}$$

where X, Y, and Z . . . are the weight % of respective monomers and $\log(P)_1$, $\log(P)_2$, and $\log(P)_3$ . . . are the respective log(P) values of the individual monomers reacted to form the three-dimensional polymer network. Although general Equation (1) illustrates a calculation using three (3) monomers, this equation can be modified to account for reaction systems including only two (2) monomers or more than three (3) monomers.

As noted above, a substantially water soluble monomer may be defined by (i) an actual or calculated water solubility, (ii) a log(P) value, or (iii) a combination thereof. Table 1 lists a variety of monomers along with their respective calculated water solubility as well as their respective log(P) value. Although the water solubility of a monomer can be readily determined by one of skill in the art by addition of the monomer in question to water at a controlled temperature, such determination can be time consuming. In this regard, the use of calculated values may be more suitable for evaluation of monomers. For instance, the Environmental Protection Agency (EPA) of the United States has developed a set of software tools that can calculate the estimated water solubility of organic compounds based on their molecular structures and the sum of the relative solubility contributions of the molecular fragments from which they are comprised. The WATERNT program and estimation methodology were developed at Syracuse Research Corporation for the EPA. The estimation methodology is based upon a "fragment constant" method very similar to the method of the WSKOWWIN Program, which estimates octanol-water partition coefficients. A journal article by Meylan and Howard (Meylan, W. M. and Howard, P. H. J. Pharm. Sci. 1995, 84, 83-93.), which is incorporated in its entirety by reference, describes the WSKOWWIN program methodology—the same methodology was used to derive "fragment constant" values for WATERNT. The water solubilities are estimated either directly from the fragment analysis using the WATERNT program, or indirectly from the log P value, which is determined using the WSKOWWIN program. Table 1 lists the calculated water solubilities calculated using the WSKOWWIN program. Also included in Table 1 are the corresponding values of log P for the compounds listed.

TABLE 1

Water Solubilites and log(P) Values: U.S. EPA 2018 Estimation Programs Interface Suite ™ for Microsoft ® Windows, v 4.11. United States Environmental Protection Agency, Washington, DC, USA.

| Molecule | CAS No. | Water Solubility @ 25 C. (mg/L) | Log P |
| --- | --- | --- | --- |
| N,N'-Diallyltartramide | 58477-85-3 | 29810 | −1.51 |
| Poly(ethylene glycol) methyl ether acrylate | 32171-39-4 | 40000 | −0.64 |
| 2,2'-thiodiethanol | 111-48-8 | 340000 | −0.63 |
| DL-Dithiothreitol | 3483-12-3 | 185600 | −0.48 |
| Pentaerythritol allyl ether | 91648-24-7 | 88860 | −0.22 |
| Carboxyethyl acrylate | 24615-84-7 | 236000 | −0.02 |
| Poly(ethylene glycol) diacrylate | 26570-48-9 | 6306 | 0.02 |
| Di(ethylene glycol) divinyl ether | 764-99-8 | 44580 | 0.23 |
| Acrylic acid | 79-10-7 | 168000 | 0.35 |
| N-vinyl pyrrolidone | 88-12-0 | 52090 | 0.37 |
| Trimethylopropane ethoxylate triacrylate, MW = 692 | 28961-43-5 | 18 | 0.39 |
| 2-Hydroxyethyl methacrylate | 868-77-9 | 117900 | 0.47 |
| 2,2'-(Ethylenedioxy)diethanethiol | 14970-87-7 | 14590 | 0.66 |
| Vinyl acetate | 108-05-4 | 30250 | 0.73 |
| Di(ethylene glycol) diacrylate | 4074-88-8 | 7082 | 0.84 |
| Ethylene glycol diacrylate | 11/5/2274 | 6863 | 1.11 |
| Tetra(ethylene glycol) diacrylate | 17831-71-9 | 998.8 | 1.26 |
| Ethylene glycol bis(mercaptopropionate) | 22504-50-3 | 2238 | 1.27 |
| Ethyl acrylate | 140-88-5 | 8717 | 1.32 |
| Methyl methacrylate | 80-62-6 | 7747 | 1.38 |
| Allyl ether | 557-40-4 | 3728 | 1.76 |
| Tri(propylene glycol) diacrylate | 42978-66-5 | 342.2 | 1.82 |
| Di(ethylene glycol) dimethacrylate | 2358-84-1 | 581.5 | 1.93 |
| 1,3-butanediol diacrylate | 19485-03-1 | 836.7 | 2.02 |
| 1,4-butanediol diacrylate | 1070-70-8 | 724.1 | 2.1 |

TABLE 1-continued

Water Solubilites and log(P) Values: U.S. EPA 2018 Estimation Programs
Interface Suite ™ for Microsoft ® Windows, v
4.11. United States Environmental Protection Agency, Washington, DC, USA.

| Molecule | CAS No. | Water Solubility @ 25 C. (mg/L) | Log P |
|---|---|---|---|
| Ethylene glycol dimethacrylate | 97-90-5 | 580.5 | 2.21 |
| Butyl acrylate | 141-32-2 | 902.1 | 2.36 |
| Neopentyl glycol diacrylate | 2223-82-7 | 290.3 | 2.48 |
| Pentaerythritol tetrakis(mercaptopropionate) | 7575-23-7 | 5.22 | 2.59 |
| Allyl sulfide | 592-88-1 | 620.5 | 2.61 |
| Butyl methacrylate | 97-88-1 | 284.6 | 2.88 |
| Styrene | 100-42-5 | 343.7 | 2.95 |
| 1,3-benzenedimethanethiol | 105-09-9 | 176.5 | 2.98 |
| trimethylolpropane tris(mercaptopropionate) | 33007-83-9 | 7 | 3.1 |
| Diallyl phthalate | 131-17-9 | 43.27 | 3.23 |
| Bisphenol A glycerolate (1 glycerol/phenol) diacrylate | 4687-98-9 | 0.46 | 3.85 |
| Neopentyl glycol propoxylate (1PO/OH) dimethacrylate | n/a | 2.86 | 3.86 |
| 2-Ethylhexylacrylate | 103-11-7 | 16.8 | 4.09 |
| 1,12-Dodecanediol dimethacrylate | 72829-09-5 | 0.01 | 7.12 |

In accordance with certain embodiments of the invention, for example, the cross-linked three-dimensional polymer network may comprise the reaction product of at least a first monomer including at least three (3) thiol functional groups and a second monomer including at least two (2) vinyl functional groups (e.g., functional groups including at least one double bond) or at least one (1) alkyne functional groups (e.g., functional groups including at least one triple bond). In accordance with certain embodiments of the invention, for example, the second monomer can comprise an acrylate and/or methacrylate groups among other groups having double and/or triple bonds as discussed in more detail below. For instance, the second monomer may comprise an acrylate or methacrylate group, an allylic group, an alkyne group, a styrenic group, a vinyl ether group, a vinyl ester group, a vinyl amide group, a maleate group, a fumarate group, a crotonate group, a cinnamate group, or a norbornene group. In this regard, the first monomer including at least three (3) thiol functional groups facilitates the formation of the three-dimensional characteristic of the GPE-compositions. In accordance with certain embodiments of the invention, the cross-linked three-dimensional polymer network may comprise the reaction product of the first monomer, the second monomer, and a third monomer including at least two (2) thiol groups, wherein the first monomer and the third monomer are different. In accordance with certain embodiments of the invention, the first polymer may comprise at least two (2) thiol functional groups and the second monomer may comprise at least three (3) vinyl or (2) two alkyne functional groups. In this regard, the cross-linked three-dimensional polymer network may comprise the reaction product of the first polymer that includes at least two (2) thiol functional groups and the second monomer that includes at least three (3) vinyl or (2) two alkyne functional groups, in which the second monomer in such embodiments of the invention facilitates the formation of the three-dimensional characteristics of the GPE-compositions.

In accordance with certain embodiments of the invention, example Reaction Scheme (1) below illustrates the combination of monomers cured in an aqueous medium including a lithium salt to provide a cross-linked three-dimensional polymeric network:

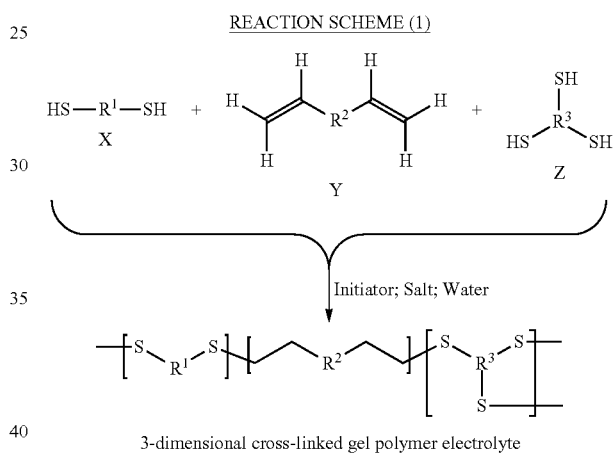

3-dimensional cross-linked gel polymer electrolyte

In example Reaction Scheme (1), in accordance with certain embodiments of the invention, 'R$^1$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2,2'-thiodiethanethiol, 1,2-ethanethiol, 1,3-propane thiol, 2,3-dimercapto-1-propanol, 1,4-butane thiol, 2,3-butanedithiol, 1,3-benzenedithiol, 1,2-benzenedimethanethiol, 1,3-benzenedimethanethiol, benzene-1,2-dithiol, benzene-1,3,-dithiol, poly(ethylene glycol)dithiol, poly(propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethylene glycol bis(3-mercaptopropionate), and ethylene glycol bismercaptoacetate. Monomers based on short aliphatic chains ($C_1$-$C_6$), those possessing hydroxyl (OH), ethylene glycol/oxide (EO), or propylene glycol/oxide (PO) functionality, or combinations thereof, such as 2,2'-thiodiethanethiol, 2,3-dimercapto-1-propanol, poly(ethylene glycol)dithiol, poly (propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethylene glycol bis(3-mercaptopropionate), and ethylene glycol bismercaptoacetate are more water-soluble, and may thus be more preferred in accordance with certain embodiments of the invention.

In example Reaction Scheme (1), in accordance with certain embodiments of the invention, 'R$^2$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2-methacryloyloxyethyl acrylate (ethylene glycol acrylate methacrylate), 1,4-butanediol divinyl ether, 1,4-cyclohexanedimethanol divinyl ether, tri(ethylene glycol) divinyl ether, di(ethylene glycol) divinyl ether, poly(ethylene glycol) divinyl ether, diallyl phthalate, diallylpyrocarbonate, trimethylolpropane diallyl ether, allyl ether, allyl disulfide, allyl sulfide, N,N'-diallyltartramide, 1,2,-diallyl-1,2-cyclohexanediol, 1,4-diallyl-2,3,5,6-piperazonetetrone, 1,3-butanediol di(meth)acrylate, 1,4-butanediol di(meth)acrylate, 1,6,-hexane di(meth)acrylate, bisphenol A ethoxylate di(methacrylate), poly (ethylene glycol) di(meth)acrylate, ethylene glycol di(meth) acrylate, glycerol 1,3-diglycerolate di(meth)acrylate, di(ethylene glycol) di(meth)acrylate, neopentyl glycol di(meth)acrylate, tetra(ethylene glycol) di(meth)acrylate, poly(propylene glycol) di(meth)acrylate, tri(ethylene glycol) di(meth)acrylate, tri(propylene glycol) di(meth)acrylate, bisphenol A glycerolate (1glycerol/phenol) di(meth) acrylate, 1,6,-hexanediol ethoxylate diacrylate, bisphenol F (2 EO/phenol), neopentyl glycol propoxylate (1 PO/OH) di(meth)acrylate, and trimethylolpropane ethoxylate (1PO/OH) methyl ether di(meth)acrylate. Monomers based on short aliphatic chains ($C_1$-$C_6$), those possessing hydroxyl (OH), ethylene glycol/oxide (EO), or propylene glycol/oxide (PO) functionality, or combinations thereof, such as1,4-butanediol divinyl ether, tri(ethylene glycol) divinyl ether, di(ethylene glycol) divinyl ether, poly(ethylene glycol) divinyl ether, diallyl phthalate, diallylpyrocarbonate, trimethylolpropane diallyl ether, allyl ether, allyl disulfide, allyl sulfide, N,N'-diallyltartramide, 1,4-diallyl-2,3,4,5-piperazonetetrone, 1,3-butanediol di(meth)acrylate, 1,4-butanediol di(meth)acrylate, bisphenol A ethoxylate di(methacrylate), poly(ethylene glycol) di(meth)acrylate, ethylene glycol di(meth)acrylate, 2-methacryloyloxyethyl acrylate (ethylene glycol acrylate methacrylate), glycerol 1,3-diglycerolate di(meth)acrylate, di(ethylene glycol) di(meth)acrylate, neopentyl glycol di(meth)acrylate, tetra(ethylene glycol) di(meth)acrylate, poly(propylene glycol) di(meth) acrylate, tri(ethylene glycol) di(meth)acrylate, tri(propylene glycol) di(meth)acrylate, bisphenol A glycerolate (1 glycerol/phenol) di(meth)acrylate, 1,6,-hexanediol ethoxylate diacrylate, bisphenol F (2 EO/phenol), neopentyl glycol propoxylate (1 PO/OH) di(meth)acrylate, trimethylolpropane ethoxylate (1PO/OH) methyl ether di(meth)acrylate, and 2-methacryloyloxyethyl acrylate (ethylene glycol acrylate methacrylate) are more water-soluble, and may thus be more preferred in accordance with certain embodiments of the invention.

In example Reaction Scheme (1), in accordance with certain embodiments of the invention, 'R$^3$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: trimethylolpropane tris(3-mercaptopropionate), trimethylolpropane tris (mercaptoacetate), pentaerythritol tris(3-mercaptoprionate), 2-hydroxymethyl-2-methyl-1,3-propanediol tris(3-mercaptopropionate), pentaerythritol tris(mercaptoacetate), tris[2-(3-mercaptopropionyloxyethyl]isocyanurate, 4 arm poly (ethylene glycol) tetrathiol, pentaerythritol tetrakis(3-mercaptopropionate), pentaerythritol tetrakis (mercaptoacetate), and dipentaerythritol hexa(3-mercaptopropionate).

In example Reaction Scheme (1), coefficients 'X', 'Y', and 'Z' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the moles of the monomer having three reactive thiol groups). For simplicity, the sum of 'X', 'Y', and 'Z' may be a value of 1.0 (e.g., accounts for 100% of the monomer content). In accordance with certain embodiments of the invention the coefficient 'X' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Z' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. For example only, reactant mixtures including equal amounts (e.g., in moles or % weight) of the three monomers in reaction scheme (1) would comprise coefficient values for each of 'X', 'Y', and 'Z' of ⅓ (i.e., X=⅓; Y=⅓; and Z=⅓). In accordance with certain embodiments of the invention, for example, 'Z' may comprise from about 0.01 to about 0.35 (e.g., 1-35% by weight of the total monomer weight), such as from about 0.02 to about 0.20 (e.g., 2-20% by weight of the total monomer weight) or from about 0.05 to about 0.15 (e.g., 5-15% by weight of the total monomer weight).

In example Reaction Scheme (1), in accordance with certain example embodiments of the invention, the mole ratios of the 'X' monomer (e.g., includes $R^1$) and the 'Y" monomer (e.g., includes $R^2$) may be determined such that the ratio of the total number of moles of thiol groups and the total moles of vinyl groups in all of the monomers is approximately 1:1. For example, moles of thiols in the 'X' (e.g., includes $R^1$) monomer and the 'Z' monomer (e.g., includes $R^3$) is the same (or substantially the same) as the number of moles of vinyl groups in the 'Y' monomer (e.g., includes $R^2$), or approximately 2:1 if and the 'Y' monomer (e.g., includes $R^2$) has alkyne functionality. Table 1 provides a non-limiting example recipe for respective monomer content. Although not shown in Table 1, the non-limiting example recipe shown in Table 2 also includes 0.080 g of photo-initiator: 2,2-dimethoxy-2-phenylacetophenone (DMPA). In accordance with certain embodiments of the invention, the specific choice of photo-initiator may be varied and the amount can vary as described herein.

TABLE 2

Example Monomer Content in Reactant System

| Monomer | MW (g/mol): | Mass(g): | wt % | moles: | mole % | vinyl moles: | SH moles: | Funct. Grp Ratio |
|---|---|---|---|---|---|---|---|---|
| EEDET | 182.3 | 3.36 | 36.4 | 0.01843 | 0.414 | n/a | 0.037 | 40% |
| TEGDVE | 202.25 | 4.66 | 50.4 | 0.02304 | 0.517 | 0.046 | n/a | 50% |
| TMPTMP | 398.56 | 1.22 | 13.2 | 0.00306 | 0.069 | n/a | 0.009 | 10% |

TEGDVE = tri(ethylene glycol) divinyl ether
EEDET = 2,2'-(Ethylenedioxy)diethanethiol
TMPTMP = trimethyiolpropane tris(3-mercaptopropionate)

In accordance with certain embodiments of the invention, example Reaction Scheme (2) below illustrates the combination of monomers cured in an aqueous medium including an alkali, alkaline earth metal, or zinc salt to provide a cross-linked three-dimensional polymeric network:

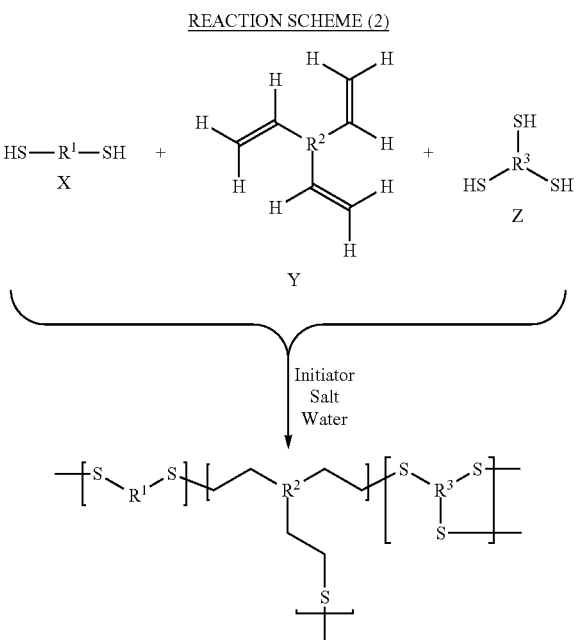

REACTION SCHEME (2)

In example Reaction Scheme (2), in accordance with certain embodiments of the invention, '$R^1$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2,2'-thiodiethanethiol, 1,2-ethanethiol, 1,3-propane thiol, 2,3-dimercapto-1-propanol, 1,4-butane thiol, 2,3-butanedithiol, 1,3-benzenedithiol, 1,2-benzenedimethanethiol, 1,3-benzenedimethanethiol, benzene-1,2-dithiol, benzene-1,3,-dithiol, poly(ethylene glycol)dithiol, poly(propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethyleneglycol bis(3-mercaptopropionate), and ethylene glycol bismercaptoacetate. Monomers based on short aliphatic chains ($C_1$-$C_6$), those possessing hydroxyl (OH), ethylene glycol/oxide (EO), or propylene glycol/oxide (PO) functionality, or combinations thereof, such as 2,2'-thiodiethanethiol, 2,3-dimercapto-1-propanol, poly(ethylene glycol)dithiol, poly (propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethyleneglycol bis(3-mercaptopropionate), and ethylene glycol bismercaptoacetate are more water-soluble, and may thus be more preferred in accordance with certain embodiments of the invention.

In example Reaction Scheme (2), in accordance with certain embodiments of the invention, '$R^2$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that monomer is substantially water-soluble. Non-limiting examples of monomers that satisfy this definition include but are not limited to the following: 1,2,4-trivinylcyclohexane, diallylmaleate. 3,9-divinyl-2,4,8,10-tetraoxaspiro [5.5]undecane, 1,3,5-triallyl-1,3,5-triazine-2,4,6(1H,3H, 5H)-trione, 2,4,6-triallyloxy-1,3,5-triazine, pentaerythritol allyl ether, pentaerythritol triallyl ether, trimethylolpropane allyl ether, glyoxal bis(diallyl ether), trimethylolpropane tri(meth)acrylate, pentaerythritol tri(meth)acrylate, trimethylolpropane ethoxylate tri(meth)acrylate, trimethylolpropane tri(meth)acrylate, glycerol propoxylate (1PO/OH) tri (meth)acrylate, trimethylolpropane propoxylate tri(meth) acrylate, pentaerythritol tetra(meth)acrylate, di(trimethylolpropane) tetra(meth)acrylate. Monomers based on short aliphatic chains ($C_1$-$C_6$), those possessing hydroxyl (OH), ethylene glycol/oxide (EO), or propylene glycol/oxide (PO) functionality, or combinations thereof, such as diallylmaleate. 3,9-divinyl-2,4,8,10-tetraoxaspiro [5.5]undecane, 1,3,5-triallyl-1,3,5-triazine-2,4,6(1H,3H, 5H)-trione, 2,4,6-triallyloxy-1,3,5-triazine, pentaerythritol allyl ether, pentaerythritol triallyl ether, trimethylolpropane allyl ether, glyoxal bis(diallyl ether), trimethylolpropane tri(meth)acrylate, pentaerythritol tri(meth)acrylate, trimethylolpropane ethoxylate tri(meth)acrylate, trimethylolpropane tri(meth)acrylate, glycerol propoxylate (1PO/OH) tri(meth)acrylate, trimethylolpropane propoxylate tri(meth)acrylate, pentaerythritol tetra(meth)acrylate, di(trimethylolpropane) tetra(meth)acrylate are more water-soluble, and are thus more preferred In example Reaction Scheme (2), in accordance with certain embodiments of the invention, '$R^3$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: trimethylolpropane tris(3-mercaptopropionate), trimethylolpropane tris(mercaptoacetate), pentaerythritol tris(3-mercaptoprionate), 2-hydroxymethyl-2-methyl-1,3-propanediol tris(3-mercaptopropionate), pentaerythritol tris(mercaptoacetate), tris[2-(3-mercaptopropionyloxyethyl]isocyanurate, 4 arm poly(ethylene glycol) tetrathiol, pentaerythritol tetrakis(3-mercaptopropionate), pentaerythritol tetrakis(mercaptoacetate), and dipentaerythritol hexa(3-mercaptopropionate).

In example Reaction Scheme (2), coefficients 'X', 'Y', and 'Z' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the moles of the monomer having three reactive thiol groups). For simplicity, the sum of 'X', 'Y', and 'Z' may be a value of 1.0 (e.g., accounts for 100% of the monomer content). In accordance with certain embodiments of the invention, the coefficient 'X' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 7' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. For example only, reactant mixtures including equal amounts (e.g., in moles or % weight) of the three monomers in reaction scheme (1) would comprise coefficient values for each of 'X', 'Y', and 'Z' of ⅓ (i.e., X=⅓; Y=⅓; and Z=⅓). In accordance with certain embodiments of the invention, for example, 'Y' may comprise from about 0.01 to about 0.35 (e.g., 1-35% by weight of the total monomer weight), such as from about 0.02 to about 0.20 (e.g., 2-20% by weight of the total monomer weight) or from about 0.05 to about 0.15 (e.g., 5-15% by weight of the total monomer weight).

In example Reaction Scheme (2), in accordance with certain example embodiments of the invention, the weight percent of the 'X' monomer (e.g., includes $R^1$) may be varied such that the total moles of thiol functionality (e.g., in the 'X' monomer +those in the 'Z' monomer if used) are approximately equal to the moles of vinyl functionality in the 'Y' monomer.

In accordance with certain embodiments of the invention, the total combination or sum of all of the monomers prior to, during, and/or after being radically-cured may comprise from about 10 to about 75 wt. % of the total composition (e.g., aqueous composition prior to being radically-cured or the cured GPE-composition), such as at most about any of the following: 75, 70, 65, 60, 55, 50, 45, 40, 35, 30, and 25 wt. % of the total composition (e.g., aqueous composition prior to being radically-cured or the cured GPE-composition) and/or at least about any of the following: 10, 12, 15, 20, 25, 30, 35, 40, 45, 50, and 55 wt. % of the total composition (e.g., aqueous composition prior to being radically-cured or the cured GPE-composition). For example, the total monomer content may comprise from about 10% to about 50% by weight of the GPE-composition (e.g., from about 15% to about 35% by weight of the GPE-composition, from about 15% to about 30% by weight of the GPE-composition, etc.).

In accordance with certain embodiments of the invention, the pre-cured composition comprising the combination of monomers may also comprise a free radical initiator (e.g., chemical initiator, thermal initiator, photo-initiator, or redox initiation system), in which the free radical initiator may be present from about 0.25 to about 10 wt. % of the total monomer mass in the composition prior to being radically-cured. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the GPE-composition may comprise less than 10% by weight, such less than 5% by weight, or less than 1% by weight of an organic solvent. In accordance with certain embodiments of the invention, the GPE-composition may be devoid of an organic solvent.

In accordance with certain embodiments of the invention, the GPE-composition and/or the pre-cured composition comprising the combination of monomers may also comprise one or more electrolytes, such as alkali metal salts. In accordance with certain embodiments of the invention, the one or more electrolytes may include a compound capable of generating an ion on being dissolved in a solvent (e.g., an aqueous solvent) including lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$), lithium bis(perfluoroethanesulfonyl)imide (LiN(SO$_2$C$_2$F$_5$)$_2$), tris(trifluoromethanesulfonyl)methyllithium (LiC(SO$_2$CF$_3$)$_3$), tris(perfluoroethanesulfonyl)methyllithium (LiC(SO$_2$C$_2$F$_5$)$_3$), lithium tetrachloroaluminate (LiAlCl$_4$), lithium hexafluorosilicate (Li$_2$SiF$_6$), and lithium dicyanamide (LiC$_2$N$_3$). Additionally or alternatively to lithium salts, the electrolyte(s) may be selected from sodium salts, magnesium salts, zinc salts, and calcium salts. In accordance with certain embodiments of the invention, the one or more electrolytes may comprise lithium bis(trifluoromethanesulfonyl)imide (LiTFSI), lithium trifluoromethanesulfonate (LiOTf), lithium chloride (LiCl), lithium perchlorate (LiClO$_4$), lithium bromide (LiBr), lithium iodide (LiI), lithium thiocyanate (LiSCN), lithium tetrafluoroborate (LiBF$_4$), lithium hexafluoroarsenate (LiAsF$_6$), lithium bis(oxalate)borate, lithium hexafluorophosphate (LiPF$_6$), a lithium polysulfide, zinc trifluoromethanesulfonate (Zn (OTf)$_2$), di[bis(trifluoromethanesulfonyl)imide) (Zn(TFSI)$_2$), or combinations thereof. In accordance with certain embodiments of the invention, the one or more electrolytes may be dispersed and/or dissolved in water and be present in a concentration from about 1 molal (i.e., molality being the moles of solute per kg of solvent) to about 30 molal based on the water in the composition, such as at most about any of the following: 30, 28, 26, 24, 22, 20, 18, 16, 14, 12, 10, and 8 molal based on the water in the composition and/or at least about any of the following: 1, 2, 3, 4, 5, 6, 7, 8, 9, 10, 12, 14, 16, 18, and 20 molal based on the water in the composition. For example, the one or more electrolytes may be dispersed and/or dissolved in water and be present in a concentration from about 4 to about 30 molal based on the water in the composition, such as from about 20 to about 30 molal based on the water in the composition. In accordance with certain embodiments of the invention, the GPE-compositions may have a conductivity from about $10^{-4}$ to about $10^{-3}$ S/cm.

In accordance with certain embodiments of the invention, the pre-cured composition may comprise the combination of monomers, one or more electrolytes, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, dried cathode slurries, dried anode slurries, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

As noted above, the GPE-compositions may comprise a cross-linked three-dimensional network in the form of a hydrogel that retains an electrolyte solution. The three-dimensional polymer network may be formed or defined by a reaction product of a variety of substantially water soluble monomers. In accordance with certain embodiments of the invention, the chemistry for forming the GPE-compositions may be based upon the radically-mediated polymerization of appropriately functionalized thiol and olefinic monomers, and/or acrylate or methacrylate monomers in the presence of free-radical initiators, which can be cured into cross-linked three-dimensional networks when some or all of the monomers possess, for example, two or more thiol, olefinic, acrylate, or methacrylate functional groups. In accordance with certain embodiments of the invention, the acrylate or methacrylate-containing monomers may possess side-chain functionalities that impart substantial water-solubility to the monomers, and water-swellability to the resulting cross-linked three-dimensional polymeric networks (e.g., hydrogels) produced therefrom. In accordance with certain embodiments of the invention, the properties (e.g., physical/mechanical, chemical, and tackiness) of the final cross-linked three-dimensional networks can be selectively tuned by varying one or more of (i) the monomer structure(s) (e.g., acrylate/methacrylate backbone and side chain), (ii) the number of the acrylate or methacrylate functionalities of the cross-linking monomers, (iii) the relative monomer stoichiometry, (iv) the radical initiator level/concentration, and (v) the polymerization conditions (e.g., temperature, concentration, and presence of additives and impurities).

In accordance with certain embodiments of the invention, the radicals used to initiate the polymerization reaction may be generated, for example, under the influence of radiation, in which the resulting process may be referred to as photo-polymerization, photo-initiated polymerization, or photo-mediated polymerization, and can be further tuned by the choice of the free radical initiator (e.g., photo-initiator), light exposure, and/or dose. The polymerization, for example, of (meth)acrylic monomers can be very sensitive to the presence of ambient oxygen gas (i.e., O$_2$) which will inhibit the polymerization, limit the extent of monomer conversion, and limit the final properties of materials formed. Oxygen gas (i.e., O$_2$) inhibition is especially problematic in the production of thin films, which possess very high surface area-to-volume ratios, thus facilitating O$_2$ exposure and diffusion into the film. For the traditional polymerization of (meth) acrylate monomers, for example, precautions needed to be taken to limit the exposure to O$_2$, which traditionally involved conducting the reaction in an inert atmosphere (e.g., devoid of O$_2$), which can impose constraints on the manner in which the reaction is performed, and typically requires more complex reaction set-ups or specialized equipment. To the contrary, certain embodiments of the invention may comprise the utilization of a photo-initiated (e.g., UV cure) process, which enables a simple reaction set-up, fast polymerization kinetics, and the ability to make the required thin film form factors with excellent spatial and temporal control. Due to the inherent O$_2$ sensitivity of monomer system based on acrylate or methacrylate-containing monomers, as described above, certain embodiments of the invention may comprise performing the photo-polymerizations on monomer mixtures that are covered by glass and/or plastic substrates which (1) are transparent, and allow the reaction to be irradiated, (2) protects the underlying reaction from O$_2$ absorption, and (3) affords the production of thin films of tunable thickness. Such embodiments of the invention, for instance, provide the advantages of simple set-up, without the need for inert gases, fast reaction kinetics, and fabrication of the targeted thin films in open air (e.g., in the presence of O$_2$). In this regard, the acrylate or methacrylate-based monomer reaction systems combined with, for example, the foregoing fabrication process allows access to the targeted GPE in the form of a thin film (e.g., in the form of a hydrogel film), while overcoming the inherent challenges of the polymerization of (meth)acrylates under ambient conditions (e.g., in the presence of O$_2$), thus significantly improving the manufacturing process. In accordance with certain embodiments of the invention, photo-chemically produced GPE-compositions in the form of thin films can be made by irradiation through a substrate that is both optically transparent to the light used for curing, and physically in contact with the monomer mixture to be cured such that it substantially free of air bubbles or voids. In addition to conducting the photo-curing between or under transparent substrates, thin films (e.g., made using doctor blade or slot die coatings) of mostly (meth)acrylate monomers can be effectively cured without the need for top substrates (i.e., exposed to $O_2$) when using UV lamps of sufficiently high irradiance. For example, thin films of (meth)acrylate monomers that are exposed to $O_2$ do not sufficiently cure to make useful GPEs when exposed using a lamp irradiance of 30 mW/cm$^2$, even after irradiation for 15 minutes. However, the same GPE-composition can be cured in a matter of minutes using a lamp irradiance of 175 mW/cm$^2$. In accordance with certain embodiments of the invention, $O_2$ sensitivity is also reduced when (meth)acrylate monomers are used in combination with thiol monomers.

In accordance with certain embodiments of the invention, the GPE-compositions may comprise a cross-linked three-dimensional polymer network and an electrolyte composition comprising an electrolyte and water. In this regard, the GPE compositions may comprise a cross-linked three-dimensional network in the form of a hydrogel that retains an electrolyte solution. The three-dimensional polymer network may be formed or defined by a reaction product of a variety of substantially water soluble monomers as noted above. In accordance with certain embodiments of the invention, the chemistry for forming the GPE compositions may be based upon the radically mediated reaction product of at least a first monomer including an acrylate or methacrylate functional groups and a second monomer or oligomer including at least two (2) free-radically polymerizable functional groups. For example, the at least two (2) free-radically polymerizable functional groups may independently from each other comprise an acrylate or methacrylate group, an allylic group, an alkynyl, a vinyl ether, a vinyl ester, a vinyl amide, a styrenic group, a maleate group, a fumarate group, or a norbornene group. In accordance with certain embodiments of the invention, in which the cross-linked three-dimensional polymer network comprises the reaction product of at least a first monomer including an acrylate or methacrylate functional group and a second monomer or oligomer including at least two (2) free-radically polymerizable functional groups, these monomers may be free of thiols. In accordance with certain embodiments of the invention, at least one of the first or second acrylate or methacrylate-containing monomer may comprise polyethylene glycol functionality (e.g., —O(C$_2$H$_4$O)$_n$H; where n has a value from 1 to 100), polypropylene glycol functionality (e.g., —O(C$_3$H$_6$O)$_n$H; where n has a value from 1 to 100, and/or glycerol functionality incorporated into the backbone of the monomer and/or grafted onto the monomer as a side-chain or a component of a side chain.

In accordance with certain embodiments of the invention, example Reaction Scheme (3) below illustrates the combination of monomers (i.e., 'W'-monomer, 'X'-monomer, 'Y'-monomer, and optional 'Z'-monomer) cured in an aqueous medium including a alkali, alkaline earth metal, or zinc salt to provide a cross-linked three-dimensional polymeric network:

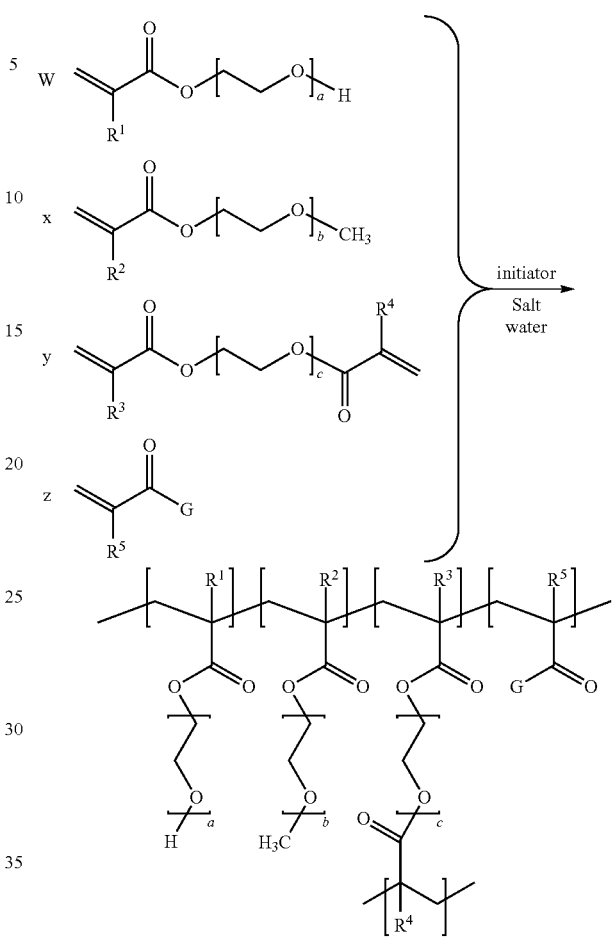

In example Reaction Scheme (3), in accordance with certain embodiments of the invention, 'R$^1$' may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that monomer is substantially water-soluble. Non-limiting examples of monomers that satisfy this definition include but are not limited to hydroxyl-terminated acrylates and methacrylates such as the following: poly (ethylene glycol) (meth)acrylate, 2-hydroxyethyl (meth) acrylate, hydroxypropyl (meth)acrylate, 4-hydroxybutyl (meth)acrylate, poly(propylene glycol) (meth)acrylate, glycerol (meth)acrylate.

In example Reaction Scheme (3), in accordance with certain embodiments of the invention, 'R$^2$' may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to alkoxy-terminated acrylates and methacrylates such as the following: poly (ethylene glycol) methyl ether (meth)acrylate, ethylene glycol methyl ether (meth)acrylate, di(ethylene glycol) methyl ether (meth)acylate, di(ethylene glycol) ethyl ether (meth) acrylate, ethylene glycol phenyl ether (meth)acrylate, tri (ethylene glycol) methyl ether (meth)acrylate, diethylene glycol butyl ether (meth)acrylate.

In example Reaction Scheme (3), in accordance with certain embodiments of the invention, '$R^3$' and '$R^4$' may independently from each other comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to all di-, tri-, and tetra-functional acrylates and methacrylates such as the following: 2-methacryloyloxyethyl acrylate (ethylene glycol acrylate methacrylate), 1,3-butanediol di(meth)acrylate, 1,4-butanediol di(meth)acrylate, 1,6,-hexane di(meth)acrylate, bisphenol A ethoxylate di(methacrylate), poly(ethylene glycol) di(meth) acrylate, ethylene glycol di(meth)acrylate, glycerol 1,3-diglycerolate di(meth)acrylate, di(ethylene glycol) di(meth) acrylate, neopentyl glycol di(meth)acrylate, tetra(ethylene glycol) di(meth)acrylate, poly(propylene glycol) di(meth) acrylate, tri(ethylene glycol) di(meth)acrylate, tri(propylene glycol) di(meth)acrylate, bisphenol A glycerolate (1glycerol/phenol) di(meth)acrylate, 1,6,-hexanediol ethoxylate diacrylate, bisphenol F (2 EO/phenol), neopentyl glycol propoxylate (1 PO/OH) di(meth)acrylate, and trimethylolpropane ethoxylate (1PO/OH) methyl ether di(meth)acrylate, trimethylolpropane tri(meth)acrylate, pentaerythritol tri(meth)acrylate, trimethylolpropane ethoxylate tri(meth) acrylate, trimethylolpropane tri(meth)acrylate, glycerol propoxylate (1PO/OH) tri(meth)acrylate, trimethylolpropane propoxylate tri(meth)acrylate, pentaerythritol tetra(meth)acrylate, di(trimethylolpropane) tetra(meth)acrylate.

In example Reaction Scheme (3), in accordance with certain embodiments of the invention, '$R^5$' (when the optional 'Z"-monomer is used) may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to the following: ethyl (meth)acrylate, (meth)acrylic acid, (meth)acrylic acid (lithium, sodium, and potassium salts), methyl 2-hydroxymethyl (meth)acrylate, ethyl 2-hydroxymethyl (meth)acrylate, furfuryl (meth)acrylate, tetrahydrofurfuryl (meth)acrylate, methyl trans-3-methoxyacrylate, ethyl 3,3-dimethylacrylate, isopropyl (meth)acrylate, 2-carboxyethyl (meth)acrylate, 2-ethoxyethyl (meth)acrylate, 2-(dimethylamino)ethyl (meth)acrylate, 3-(dimethylamino)propyl (meth)acrylate, 3-sulfopropyl (meth)acrylate (lithium, sodium, and potassium salts), acrylamide, N-isopropylacrylamide, N,N-dimethylacrylamide, N-hydroxymethyl acrylamide, itaconic acid, maleic acid, and fumaric acid.

In example Reaction Scheme (3), in accordance with certain embodiments of the invention, 'G'(when the optional 'Z"-monomer is used) may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to the following: ethyl (meth)acrylate, (meth)acrylic acid, (meth)acrylic acid (lithium, sodium, and potassium salts), methyl 2-hydroxymethyl (meth)acrylate, ethyl 2-hydroxymethyl (meth)acrylate, furfuryl (meth)acrylate, tetrahydrofurfuryl (meth)acrylate, methyl trans-3-methoxyacrylate, ethyl 3,3-dimethylacrylate, isopropyl (meth)acrylate, 2-carboxyethyl (meth)acrylate, 2-ethoxyethyl (meth)acrylate, 2-(dimethylamino)ethyl (meth)acrylate, 3-(dimethylamino)propyl (meth)acrylate, 3-sulfopropyl (meth)acrylate (lithium, sodium, and potassium salts), acrylamide, N-isopropylacrylamide, N,N-dimethylacrylamide, N-hydroxymethyl acrylamide, itaconic acid, maleic acid, and fumaric acid.

In example Reaction Scheme (3), coefficients 'W', 'X', and 'Y' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the multi-acrylate-containing monomer). For simplicity, the sum of 'W', 'X', and 'Y' may be a value of 1.0 (e.g., 100%). In accordance with certain embodiments of the invention, the coefficient 'W' may be independently selected from 0.01 to 0.99 (e.g., 1% to 99% of the total moles or total weight of the monomers in the reactant system), such as at most about any of the following: 0.99, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'X' may be independently selected from 0.01 to 0.99 (e.g., 1% to 99% of the total moles or total weight of the monomers in the reactant system), such as at most about any of the following: 0.99, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 1.0 (e.g., 1% to 100% of the total moles or total weight of the monomers in the reactant system), such as at most about any of the following: 1.0, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Z' may be independently selected from 0.0 to 0.25 (e.g., 0% to 25% of the total moles or total weight of the monomers in the reactant system), such as at most about any of the following: 0.25, 0.20, 0.15, and 0.1 and/or at least about any of the following: 0.0, 0.01, 0.02, 0.03, 0.04, 0.05, 0.1, 0.15, and 0.2. For example only, reactant mixtures including equal amounts (e.g., in moles or % weight) of the three monomers in reaction scheme (3) (excluding optional 'Z'-monomer) would comprise coefficient values for each of 'W', 'X', and 'Y' of ⅓ (i.e., W=⅓; X=⅓; and Y=⅓).

In example Reaction Scheme (3), 'a', 'b', and 'c' may have a values from 1 to 100 (e.g., 1, 2, 3, 4, 5, 6, 7, 8, 9, 10, etc.). In accordance with certain embodiments of the invention, 'a', 'b', and 'c' may independently have a value, for example, of at most about any of the following: 100, 95, 90, 85, 80, 75, 70, 65, 60, 55, 50, 45, 40, 35, 30, 25, and 20 and/or at least about any of the following: 1, 3, 5, 8, 10, 15, 20, 25, 30, 35, 40, 45, and 50. Although each of the repeat units in the backbones of the three monomers in example reaction scheme (3) have a polyethylene glycol radical, the repeating unit of each monomer may independently comprise other water solubility-imparting groups as noted previously.

In accordance with certain embodiments of the invention, the total combination or sum of all of the monomers in acrylate-based embodiments prior to, during, and/or after being radically-cured may comprise from about 10 to about 50 wt. % of the total composition (e.g., aqueous composition prior to being radically-cured or the cured GPE-composition), such as at most about any of the following: 50, 45, 40, 35, 30, 25, 20, and 15 wt. % of the total composition (e.g., aqueous composition prior to being radically-cured or the cured GPE-composition) and/or at least about any of the following: 10, 12, 15, 20, 25, and 30 wt. % of the total composition (e.g., aqueous composition prior to being radically-cured or the cured GPE-composition).

In accordance with certain embodiments of the invention, the pre-cured composition comprising the combination of monomers in acrylate-based embodiments may also comprise a free radical initiator (e.g., chemical initiator, thermal initiator, photo-initiator, or redox initiation system), in which the free radical initiator may be present from about 0.25 to about 10 wt. % of the total monomer mass in the composition prior to being radically-cured. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the GPE-composition in acrylate-based embodiments may comprise less than 10% by weight, such less than 5% by weight, or less than 1% by weight of an organic solvent. In accordance with certain embodiments of the invention, the GPE-composition may be devoid of an organic solvent.

In accordance with certain embodiments of the invention, the GPE-composition and/or the pre-cured composition comprising the combination of monomers may also comprise one or more electrolytes, such as alkali metal salts. In accordance with certain embodiments of the invention, the one or more electrolytes may be a compound capable of generating an ion on being dissolved in a solvent (e.g., an aqueous solvent) including lithium salts such as lithium hexafluorophosphate (LiPF$_6$), lithium tetrafluoroborate (LiBF$_4$), lithium hexafluoroarsenate (LiAsF$_6$), lithium perchlorate (LiClO$_4$), lithium trifluoromethanesulfonate (CF$_3$SO$_3$Li), lithium bis(trifluoromethanesulfonyl)imide (LiN(SO$_2$CF$_3$)$_2$), lithium bis(perfluoroethanesulfonyl)imide (LiN(SO$_2$C$_2$F$_5$)$_2$), tris(trifluoromethanesulfonyl)methyllithium (LiC(SO$_2$CF$_3$)$_3$), tris(perfluoroethanesulfonyl)methyllithium (LiC(SO$_2$C$_2$F$_5$)$_3$), lithium tetrachloroaluminate (LiAlCl$_4$), lithium hexafluorosilicate (Li$_2$SiF$_6$), and lithium dicyanamide (LiC$_2$N$_3$). Additionally, or alternatively to lithium salts, the electrolyte(s) may be selected from sodium salts, magnesium salts, zinc salts, and calcium salts. In accordance with certain embodiments of the invention, the one or more electrolytes may comprise lithium bis(trifluoromethanesulfonyl)imide (LiTFSI), lithium trifluoromethanesulfonate (LiOTf), lithium chloride (LiCl), lithium hexafluorophosphate (LiPF$_6$), a lithium polysulfide, zinc bis(trifluoromethanesulfonate) (Zn(OTf)$_2$), Zn(TFSI)$_2$, or combinations thereof. In accordance with certain embodiments of the invention, the one or more electrolytes may be dispersed and/or dissolved in water and be present in a concentration from about 1 molal (i.e., molality being the moles of solute per kg of solvent) to about 30 molal based on the water in the composition, such as at most about any of the following: 30, 28, 26, 24, 22, 20, 18, 16, 14, 12, 10, and 8 molal based on the water in the composition and/or at least about any of the following: 1, 2, 3, 4, 5, 6, 7, 8, 9, 10, 12, 14, 16, 18, and 20 molal based on the water in the composition. For example, the one or more electrolytes may be dispersed and/or dissolved in water and be present in a concentration from about 4 to about 30 molal based on the water in the composition, such as from about 20 to about 30 molal based on the water in the composition. In accordance with certain embodiments of the invention, the GPE-compositions may have a conductivity from about $10^{-4}$ to about $10^{-3}$ S/cm.

In accordance with certain embodiments of the invention, the pre-cured composition may comprise the combination of monomers (e.g., acrylate-based monomers), one or more electrolytes, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In another aspect, embodiments of the present invention provide electrochemical cells (e.g., and aqueous-based electrochemical cell) including an anode, a cathode and a gel polymer electrolyte (GPE) positioned between and in contact with the anode and the cathode. In accordance with certain embodiments of the invention, the cathode may comprise the positive electrode and the anode may comprise the negative electrode, in which the cathode refers to the electrode where the reduction takes place during discharge and the anode refers to the electrode where oxidation takes place during discharge. The GPE, in accordance with certain embodiments of the invention, may comprise a single layer or multiple layers and still be considered to be in contact with both the anode and cathode. In accordance with certain embodiments of the invention, the GPE includes a GPE-composition comprising (a) a cross-linked three-dimensional polymer network and (b) an electrolyte composition absorbed by the GPE, in which the electrolyte composition comprises an electrolyte and water as disclosed herein. In accordance with certain embodiments of the invention, the GPE may comprise any GPE-composition as disclosed herein. In accordance with certain embodiments of the invention, the electrochemical cells may be provided in a variety of different shapes and forms and may comprise primary and secondary electrochemical cells. For instance, electrochemical cells in accordance with certain embodiments of the invention may comprise a rigid or non-rigid configuration. Non-rigid configurations, for example, may comprise an electrochemical cell that may be flexible such that the electrochemical cell's shape or configuration may be adjustable (e.g., movable between linear/flat configuration to an arcuate configuration) prior to or during operation. In accordance with certain embodiments of the invention, the electrochemical cells (e.g., aqueous electrochemical cells) may include one or more electrode (e.g., anode and/or cathode) including a gel polymer electrolyte or derivative thereof as a component (e.g., as a binder) forming the electrode.

In accordance with certain embodiments of the invention, the electrochemical cells may comprise an operational voltage window from about 1 to about 6 volts, such as at most about any of the following: 6, 5.5, 5, 4.5, 4, 3.5, 3, and 2.5 volts and/or at least about any of the following: 1, 1.25, 1.5, 1.75, 2, 2.25, 2.5, 2.75, 3, 3.25, 3.5, 3.75, and 4 volts.

In accordance with certain embodiments of the invention, the electrochemical cells comprise a particularly improved energy density per unit mass of the electrochemical cell. In one aspect, the aqueous electrochemical cells disclosed herein do not need significant housing requirements and other added safety components used to mitigate thermal runaways associated with organic-based electrochemical cells. The reduced weight, especially coupled with the added safety associated with an aqueous electrochemical cell, may be particularly desirably in any application in which weight reduction is of importance, such as in automobiles, aircraft, aerospace applications, military equipment, and hiking equipment to name a few. In accordance with certain embodiments of the invention, the electrochemical cells may comprise energy density per unit mass of the electrochemical cell from about 0.2 to about 0.8 MJ/Kg, such as at most about any of the following: 0.8, 0.7, 0.6, 0.5, 0.4, 0.3, 0.275, 0.25, and 0.225 MJ/Kg and/or at least about any of the following: 0.2, 0.225, 0.25, 0.275, 0.3, 0.35, and 0.4 MJ/Kg.

In accordance with certain embodiments of the invention, the anode of the electrochemical cell may comprise an anode-composition comprising (a) an active anode species and (b) the GPE-composition, in which the active anode species and the GPE-composition are admixed together. For example, the GPE-composition, which may be tacky, may be used by replacing traditional electrode binders such as styrene-butadiene rubber (SBR) and polyvinylidene fluoride (PVDF) based binders. In this regard, anodes in accordance with certain embodiments of the invention may be devoid on an SBR and/or PVDF. Additionally or alternatively, the cathode of the electrochemical cell may comprise a cathode-composition comprising (a) an active cathode species and (b) the GPE-composition; wherein the active cathode species and the GPE-composition are admixed together. For example, the GPE-composition, which may be tacky, may be used by replacing traditional electrode binders such as styrene-butadiene rubber (SBR) and polyvinylidene fluoride (PVDF) based binders. In this regard, cathodes in accordance with certain embodiments of the invention may be devoid on an SBR and/or PVDF. In accordance with certain embodiments of the invention, the cathode and/or the anode may comprise at least one active surface that comprises a surface of an electrode that is in physical contact with the GPE and at which electrochemical reactions may take place. For example, cathode may include cathode active surface and/or the anode can include anode active surface. In accordance with embodiments of the invention, in which the anode and/or cathode include a GPE-composition or derivative thereof incorporated therein (e.g., as a binder for the active species), the active surface may not be a simple planar interface but the active surface or interface may effectively penetrate into the respective electrode by virtue of utilizing the GPE-composition or derivative thereof into the electrode. In this regard, the interface area (e.g., surface area) between the GPE and the electrodes may effectively be greatly increased per a given exterior surface area or volume of the electrodes.

As used herein, the term "anode active species" may comprise any electrochemically active species associated with the anode. For example, the anode may comprise graphite, lithium, zinc, silicon, tin oxides, antimony oxides, or a lithium-containing material, such as lithium titanium oxide. In accordance with certain embodiments of the invention, the anode active species may comprise lithium metal or a lithium alloy. As used herein, the term "cathode active species" may comprise any electrochemically active species associated with the cathode. For example, the cathode may comprise a lithium metal oxide (e.g., a lithium-doped cobalt oxide, lithium-doped nickel oxide, a lithium-doped manganese oxide, etc.), or a sulfur-containing material (e.g., elemental sulfur).

Figure 2:
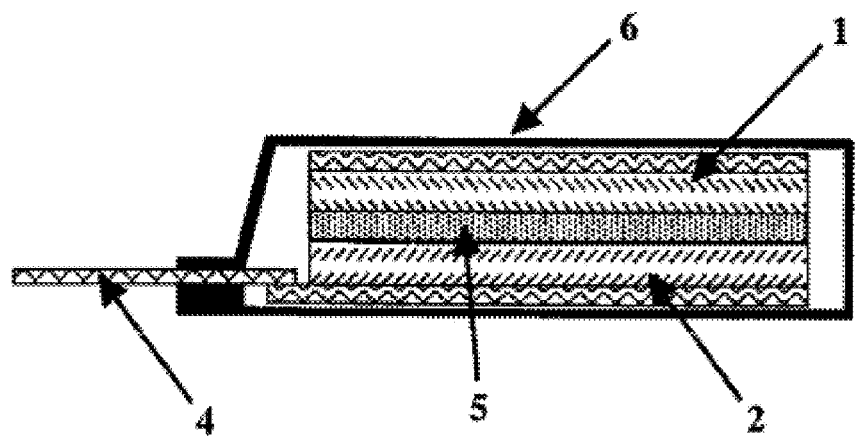
FIG. 2 illustrates a cross-sectional view of the electrochemical cell of FIG. 1.

FIG. 1 illustrates an exterior of an electrochemical cell 10 according to certain embodiments of the invention. As shown in FIG. 1, the electrochemical cell 10 may comprise battery container or housing 6, a cathode lead terminal 3 and an anode lead terminal 4 FIG. 2 illustrates a cross-sectional view of the electrochemical cell 10 of FIG. 1. As shown in FIG. 2, the electrochemical cell comprises a cathode 1, an anode 2, and a GPE 5 that is disposed between and in contact with the cathode 1 and anode 2.

Figure 3:
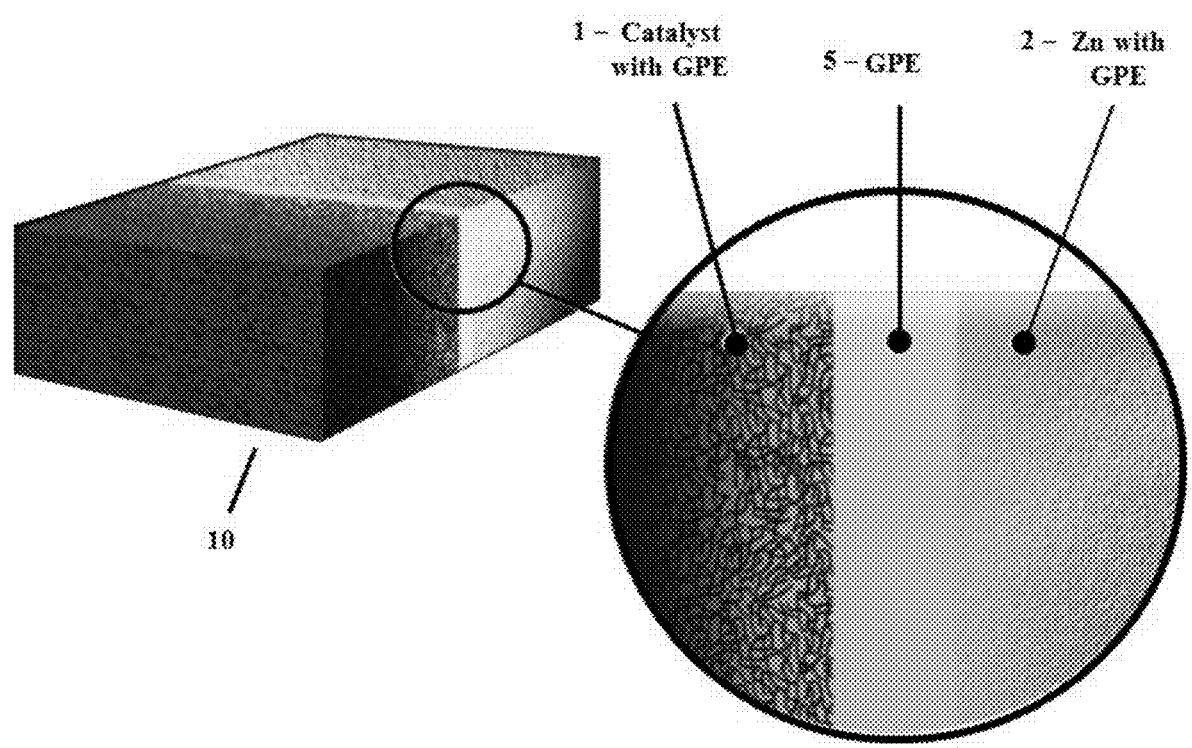
FIG. 3 is a schematic of an electrochemical cell including electrodes including a gel polymer electrolyte (GPE) composition incorporated therein, for example, in the form of a binder for the electrodes.

FIG. 3 is a schematic of an electrochemical cell 10 including electrodes including a GPE-composition incorporated in each of the electrodes in the form of a binder either alone or in combination with other binders for the electrodes. In this regard, the electrochemical cell 10 includes a cathode 1 (e.g., catalyst or active cathode species and GPE-composition) and an anode 2 (e.g., active anode species such as Zn in combination with a GPE-composition), in which a GPE 5 is located between and in contact with the cathode 1 and the anode 2. In accordance with certain embodiments of the invention, the GPE-composition incorporated into the anode and/or cathode may be chemically the same or different than that of the GPE. In accordance with certain embodiments of the invention, a rapid fabrication is provided of aqueous electrochemical cells including a GPE in which one or both electrodes include an active species admixed and bound at least in part or entirely by a GPE-composition or derivative thereof. As referenced above, standard battery electrode slurries use PVDF binder due to its excellent mechanical properties and chemical stability. However, PVDF is insoluble in water, and requires processing from toxic, strongly dipolar solvents (e.g. N-Methyl-2-pyrrolidone (NMP)), which consequently raises concerns when PVDF-based slurries and inks are to be combined with aqueous GPEs. In non-liquid based electrochemical cells, interfaces between the different layers are all the more critical and need to be optimized to ensure excellent adhesion and minimal resistance losses. In addition to adhesion, the binder needs to be compatible with the electrolyte and solvent (e.g., water in accordance with embodiments of the invention), as fully embedding the electrolyte within the anode and cathode volume maximizes active material utilization. In this regard, certain embodiments of the invention comprise the fabrication of aqueous GPE electrochemical cells comprising the replacement of PVDF (or similar binder) with a polymer that is the same or similar to the one used in the GPE, as well as incorporating the electrolyte (e.g., salt) directly in the binder/electrodes (e.g., electrode active species and GPE-composition). By embedding the GPE-composition in the electrodes, for example, a maximum utilization of the active materials (e.g., electrode active species) can be achieved and maximum interfacial adhesion may be promoted. By way of example only, the electrodes may be formed using a combination of UV/thermal curing that produce binders from physically/partially cross-linked polymers (e.g., GPE-composition). In this regard, the shift away from PVDF (or similar binder) also advantageously enables further tuning of rheological properties of the electrode slurries by replacing the high boiling point NMP solvent (or similar solvent) with a lower boiling point equivalent (e.g., acetone). As such, this enables tunable rheology while ensuring no water evaporation. Moreover, the fabrication of aqueous electrochemical cells comprising a GPE can be achieved in which each electrochemical cell layer can be sequentially fabricated using any printing technique (e.g. doctor blading, screen printing, 3-D printing, etc.) and UV or thermally cured in place. In accordance with certain embodiments of the invention, any or all of these steps may take place in aerobic conditions without the need for a dry room, inert atmosphere, or rigorous control of temperature or humidity. In this regard, these advantages dramatically reduce manufacturing costs and increase manufacturing speed, leading to a radically new way for electrochemical cell fabrication. As noted above, FIG. 3 shows a fully printed electrochemical cell 10 with the GPE-composition used as a binder in the electrodes. Although FIG. 3 illustrates a Zn-air electrochemical cell, this approach may be widely applicable to a variety of electrochemical cells, such as Li-ion, Zn-ion, hybrid aqueous electrochemical cells, and the like.

In this regard, the anode of the electrochemical cell may comprise an anode-composition comprising (a) an active anode species and (b) the GPE-composition, in which the active anode species and the GPE-composition are admixed together. For example, the GPE-composition, which may be tacky, may be used by replacing traditional electrode binders such as styrene-butadiene rubber (SBR) and polyvinylidene fluoride (PVDF) based binders. In this regard, anodes in accordance with certain embodiments of the invention may be devoid of an SBR and/or PVDF. Additionally, or alternatively, the cathode of the electrochemical cell may comprise a cathode-composition comprising (a) an active cathode species and (b) the GPE-composition; wherein the active cathode species and the GPE-composition are admixed together. For example, the GPE-composition, which may be tacky, may be used by replacing traditional electrode binders such as styrene-butadiene rubber (SBR) and polyvinylidene fluoride (PVDF) based binders. In this regard, cathodes in accordance with certain embodiments of the invention may be devoid of an SBR and/or PVDF. In accordance with certain embodiments of the invention, the cathode and/or the anode may comprise at least one active surface that comprises a surface of an electrode that is in physical contact with the GPE and at which electrochemical reactions may take place. For example, cathode may include cathode active surface and/or the anode can include anode active surface. In accordance with embodiments of the invention, in which the anode and/or cathode include a GPE-composition or derivative thereof incorporated therein (e.g., as a binder for the active species), the active surface may not be a simple planar interface but the active surface or interface may effectively penetrate into the respective electrode by virtue of utilizing the GPE-composition or derivative thereof into the electrode. In this regard, the interface area (e.g., surface area) between the GPE and the electrodes may effectively be greatly increased per a given exterior surface area or volume of the electrodes.

In accordance with certain embodiments of the invention, the GPE-composition may be (i) deposited in a flowable (e.g., liquid) form onto an electrode slurry (e.g., an anode and/or cathode slurry), (ii) allowed to diffuse into the electrode slurry (which may be bound together by PVDF or another binding polymer used in electrode fabrication), and then polymerized or cured as disclosed herein. In this regard, the GPE-composition may be polymerized or cured on top of and within the electrode (e.g., electrode slurry or dried electrode) after being allowed to diffuse or soak into the electrode slurry. For instance, the anode of the electrochemical cell may comprise an anode-composition comprising (a) an active anode species; (b) the GPE-composition; and (c) an electrode binder material (e.g., styrene-butadiene rubber (SBR) and polyvinylidene fluoride (PVDF) based binders); in which GPE-composition has diffused into the pre-admixed and dried mixture of the active anode species and the electrode binder material. Additionally or alternatively, the cathode of the electrochemical cell may comprise a cathode-composition comprising (a) an active cathode species; (b) the GPE-composition; and (c) an electrode binder material (e.g., styrene-butadiene rubber (SBR) and polyvinylidene fluoride (PVDF) based binders); in which GPE-composition has diffused into the pre-admixed and dried mixture of the active cathode species and the electrode binder material. In accordance with certain embodiments of the invention in which the GPE-composition has been allowed to diffuse into the dried electrode slurry, the GPE will beneficially be in intimate contact with the electrode active material(s). In accordance with certain embodiments of the invention, the GPE-composition incorporated into the anode and/or cathode may be chemically the same or different than that of the GPE.

In another aspect, embodiments of the present invention provide methods of forming a gel polymer electrolyte (GPE). Such methods, for instance, may include radically-curing an aqueous composition of a mixture of monomers in, for example, an oxygen-containing environment. In this regard, the aqueous composition may comprise the mixture of monomers and an electrolyte suspended or dissolved in water. In accordance with certain embodiments of the invention, the step of radically-curing the aqueous composition may not be particularly limited as long as radicals are generated to promote curing or reaction (e.g. polymerization reaction) of the monomers in the aqueous composition. For instance, radically-curing the aqueous composition may include a photo-initiated process (e.g., UV or electron beam cure), chemically and/or thermally-initiated processes. In accordance with certain embodiments of the invention, the step of radically-curing the aqueous composition may be conducted in an inert environment (e.g., devoid of oxygen) or in atmospheric conditions (e.g., oxygen-containing environment). In accordance with certain embodiments of the invention, the step of radically-curing the aqueous composition is carried out in atmospheric conditions (e.g., oxygen-containing environment), which may significantly reduce the costs and time required for the preparation of a GPE. In accordance with certain embodiments of the invention, the aqueous composition may be deposited by a variety of means onto a support substrate prior to or during the radically-curing operation.

In accordance with certain embodiments of the invention, the methods of forming a gel polymer electrolyte (GPE) may comprise radically-curing an aqueous composition of a mixture of monomers in an oxygen-containing environment; wherein the mixture of monomers comprise (i) a first group of monomers comprising at least a first monomer including at least three (3) thiol functional groups and a second monomer comprising, for example, an aliphatic chain including at least two (2) vinyl or at least one (1) alkyne functional groups; or (ii) a second group of monomers comprising at least a third monomer including an acrylate or methacrylate functional groups and a fourth polymer including at least two (2) free-radically polymerizable functional groups. In accordance with certain embodiments of the invention, the methods may comprise a step of mixing either the first group of monomers or the second group of monomers with an electrolyte in water to provide the aqueous composition and depositing a coating of aqueous composition onto a substrate prior to or during radically-curing the aqueous composition. In accordance with certain embodiments of the invention, the pre-cured composition may comprise the combination of monomers, one or more electrolytes, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

Figure 4:
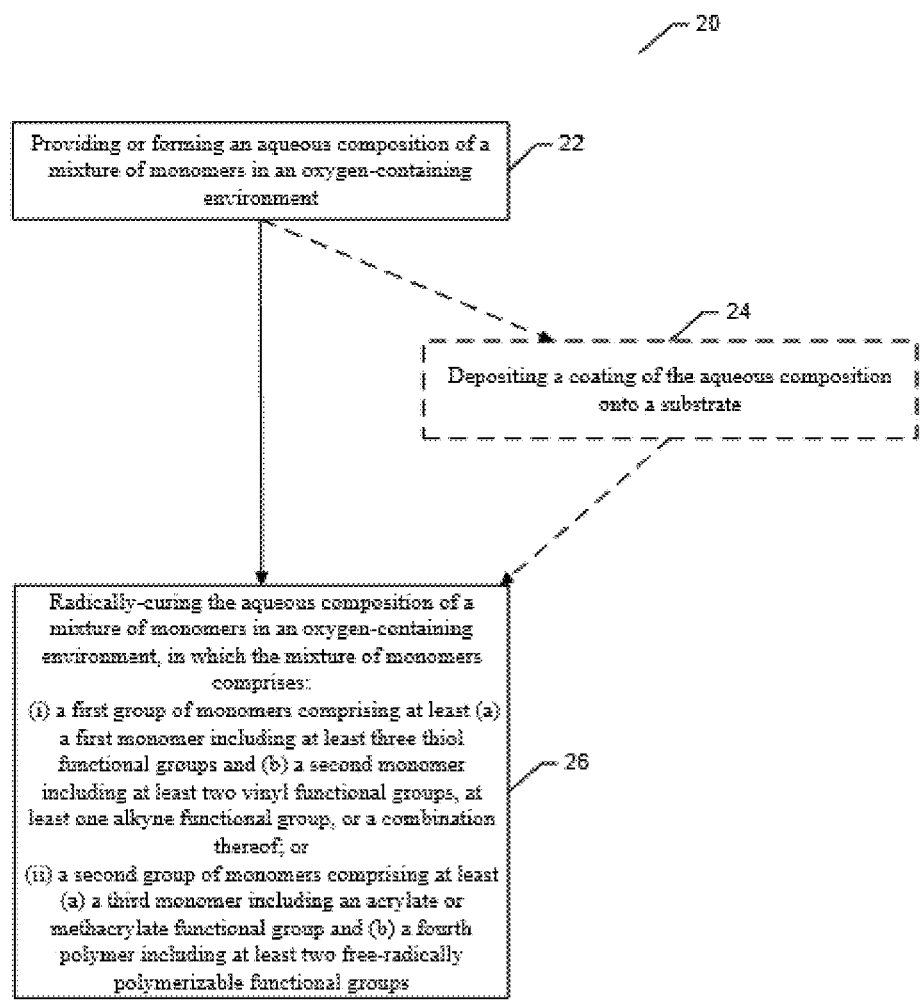
FIG. 4 illustrates a block diagram of a method for forming a GPE in accordance with certain embodiments of the invention.

FIG. 4, for example, illustrates a block diagram of a method for forming a GPE 20 in accordance with certain embodiments of the invention. The method for forming a GPE 20 illustrated by FIG. 4 may comprise step 22 of providing or forming an aqueous composition of a mixture of monomers (as disclosed herein) in, for example, an oxygen-containing environment, and radically-curing the aqueous composition of a mixture of monomers in an oxygen-containing environment at step 26, in which the mixture of monomers may comprise (i) a first group of monomers comprising at least (a) a first monomer including at least three thiol functional groups and (b) a second monomer including at least two vinyl functional groups, at least one alkyne functional group, or a combination thereof or (ii) a second group of monomers comprising at least (a) a third monomer including an acrylate or methacrylate functional group and (b) a fourth polymer including at least two free-radically polymerizable functional groups. FIG. 4 also illustrates an optional step 24 (as illustrated by dashed lines) of depositing a coating of the aqueous composition onto a substrate prior to step 26 of radically curing the aqueous composition of the mixture of monomers.

In another aspect, embodiments of the present invention provide methods of forming an electrochemical cell. In accordance with certain embodiments of the invention, the methods may include providing an anode, providing a cathode, and depositing a gel polymer electrolyte (GPE) between and in contact with the anode and the cathode. In accordance with certain embodiments of the invention, depositing the GPE may comprise positioning a pre-fabricated GPE between the anode and the cathode or forming the GPE directly onto the anode or the cathode. In accordance with certain embodiments of the invention, depositing the GPE may comprise forming a first GPE-layer directly onto the anode and forming a second GPE-layer directly onto the cathode, and further comprising a step of joining the first GPE-layer and the second GPE-layer together such that the first GPE-layer and the second GPE-layer are located between the anode and the cathode. In accordance with certain embodiments of the invention, the methods may comprise a discrete or batch-wise operation or a continuous operation. For example, certain embodiments of the invention may comprise continuously or semi-continuously depositing the GPE between a continuous roll or rolls of an anode material and/or cathode material. For example, a pre-fabricated GPE may be provided in a rolled-up form on a GPE-supply roll, the anode may be provided in a rolled-up form on an anode-supply roll, and/or the cathode may be provided in a rolled-up form on a cathode-supply roll, and the pre-fabricated GPE may be positioned (e.g., continuously) between the anode and cathode to form a continuous or semi-continuous line of an electrochemical cell that may be subsequently separated (e.g., cut) into a plurality of discrete and separate electrochemical cells.

Figure 5:
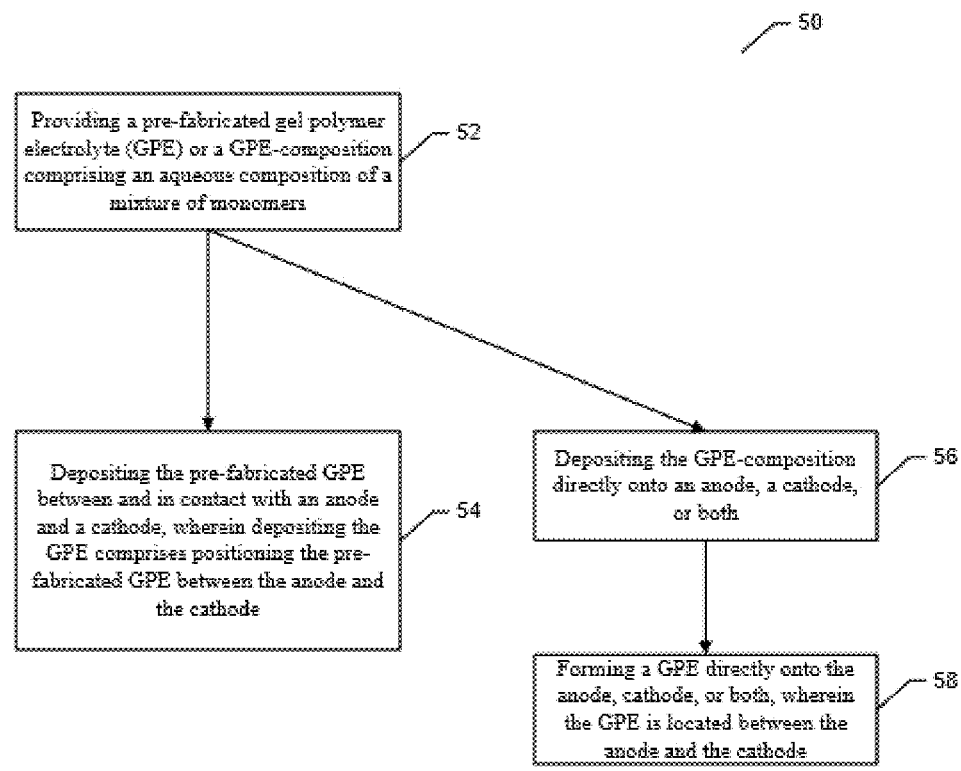
FIG. 5 illustrates a block diagram of a method for forming an electrochemical cell in accordance with certain embodiments of the invention.

FIG. 5, for example, illustrates a block diagram of a method for forming an electrochemical cell 50 in accordance with certain embodiments of the invention. The method for forming an electrochemical cell 50 illustrated by FIG. 5 may comprise step 52 of providing a pre-fabricated GPE or a GPE-composition comprising an aqueous composition of a mixture of monomers. The method may also comprise step 54 of depositing the pre-fabricated GPE between and in contact with an anode and a cathode, wherein depositing the pre-fabricated GPE comprises positioning the pre-fabricated GPE between the anode and the cathode. Alternatively to depositing the pre-fabricated GPE, the method may comprise step 56 of depositing the GPE-composition directly onto an anode, a cathode, or both, and step 58 of forming a GPE directly onto the anode, cathode, or both, in which the GPE is located between the anode and the cathode.

Figure 6:
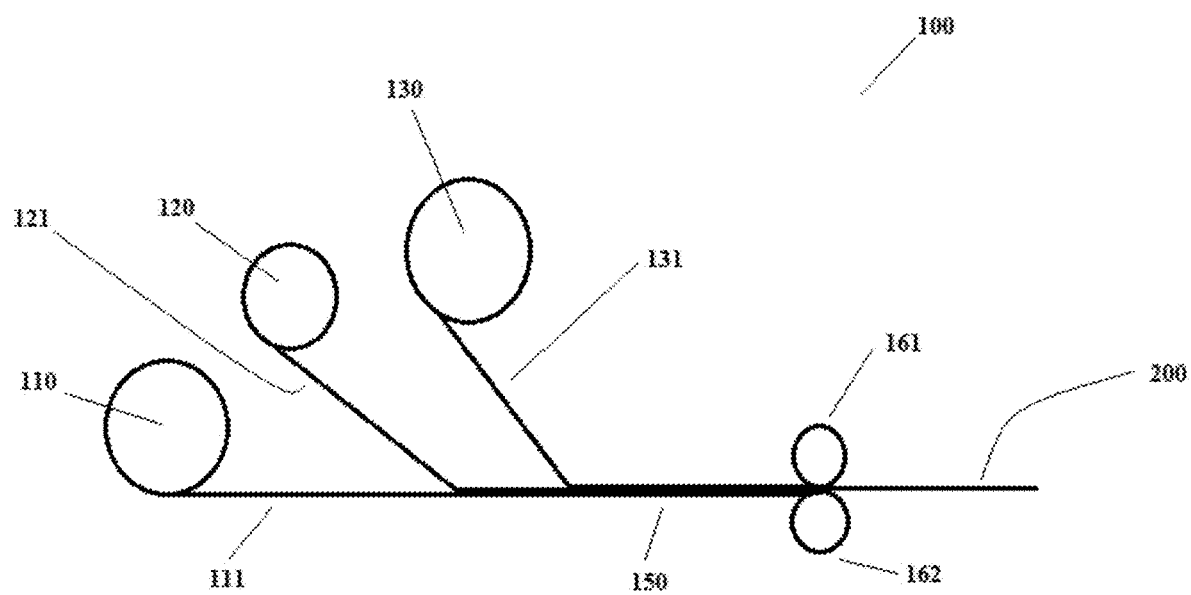
FIG. 6 illustrates a method of making an electrochemical cell in accordance with certain embodiments of the invention.

FIG. 6, for example, illustrates a method 100, such as a continuous or semi-continuous method, of making an electrochemical cell in accordance with certain embodiments of the invention. As shown in FIG. 6, an anode-supply roll 110 including a pre-fabricated anode 111 is provided and unwound, such as on a support belt (not shown). The method may further comprise providing a GPE-supply roll 120 including a pre-fabricated GPE 121. The pre-fabricated GPE 121 may be unwound and deposited on top of the pre-fabricated anode. The method may further comprise providing a cathode supply roll 130 including a pre-fabricated cathode 131. The pre-fabricated cathode 131 may be unwound and deposited on top of the pre-fabricated GPE 121, such that the pre-fabricated GPE 121 is located between the pre-fabricated anode 111 and pre-fabricated cathode 131 (e.g., pre-fabricated GPE 121 may be positioned directly between and directly adjacent to the pre-fabricated anode 111 and pre-fabricated cathode 131) to provide an uncompressed electrochemical cell material 150. In accordance with certain embodiments of the invention, the uncompressed electrochemical cell material 150 may be subjected to a compression step to more securely attached the pre-fabricated GPE 121 to both the pre-fabricated anode 111 and pre-fabricated cathode 131, such as by compression rolls 161, 162 to provide a secure electrochemical cell material 200. Although not shown in FIG. 6, the electrochemical cell may be immediately or subsequently subjected to a cutting and/or punching operation to partition the secure electrochemical cell material 200 into a plurality of separate and distinct electrochemical cells as disclosed herein. In this regard, certain embodiments of the invention comprise the mass production of a plurality of electrochemical cells.

Figure 7:
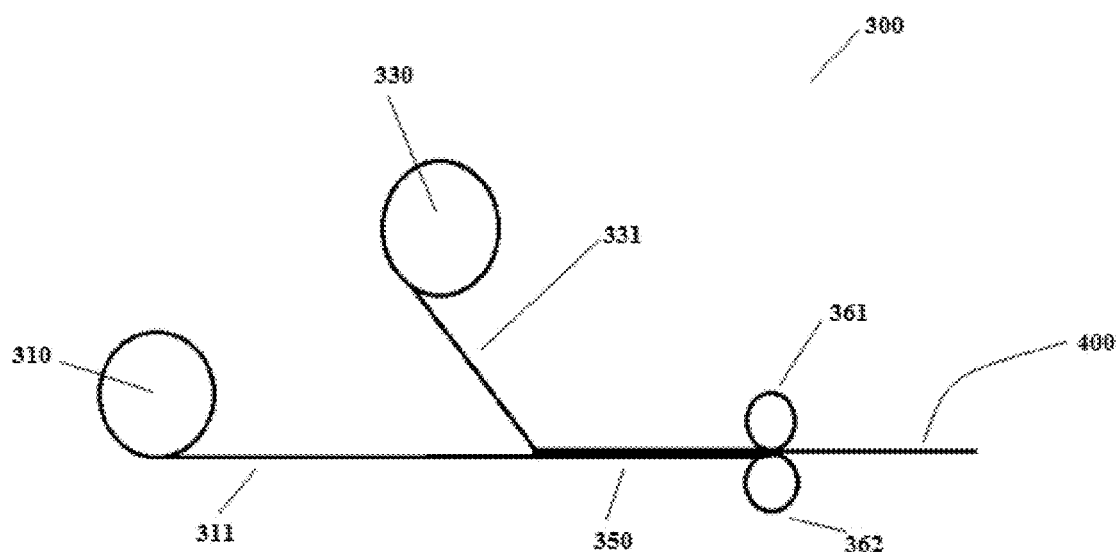
FIG. 7 illustrates a method of making an electrochemical cell in accordance with certain embodiments of the invention.

FIG. 7, for example, illustrates a method 300, such as a continuous or semi-continuous method, of making an electrochemical cell in accordance with certain embodiments of the invention. As shown in FIG. 7, an anode-supply roll 310 including a pre-fabricated anode 311 is provided and unwound, such as on a support belt (not shown). In accordance with certain embodiments of the invention, the pre-fabricated anode 311 includes a pre-cured GPE adhered to a solidified anode slurry. In this regard, the GPE-composition may be deposited and cured directly onto the solidified anode slurry such that the pre-fabricated anode 311 includes an anode layer and a GPE layer adhered onto one surface of the anode layer. The method may also comprise providing a cathode-supply roll 330 including a pre-fabricated cathode 331, in which the pre-fabricated cathode 331 may be unwound and deposited onto or placed into physical contact with the pre-fabricated anode 311. Similarly to the pre-fabricated anode 311, the pre-fabricated cathode 331 may include a pre-cured GPE adhered to a solidified cathode slurry. In this regard, the GPE-composition may be deposited and cured directly onto the solidified cathode slurry such that the pre-fabricated cathode 331 includes a cathode layer and a GPE layer adhered onto one surface of the cathode layer. In this regard, the pre-fabricated cathode 331 and the pre-fabricated anode 311 may be placed on top of each other such that the GPE layer from each of the pre-fabricated anode 311 and pre-fabricated cathode 331 are located between the anode layer and the cathode layer to provide an uncompressed electrochemical cell material 350. In accordance with certain embodiments of the invention, the uncompressed electrochemical cell material 350 may be subjected to a compression step to more securely the pre-fabricated anode 311 and pre-fabricated cathode 331, such as by compression rolls 361, 362 to provide a secure electrochemical cell material 400. Although not shown in FIG. 7, the electrochemical cell may be immediately or subsequently subjected to a cutting and/or punching operation to partition the secure electrochemical cell material 400 into a plurality of separate and distinct electrochemical cells as disclosed herein. In this regard, certain embodiments of the invention comprise the mass production of a plurality of electrochemical cells.

Although FIG. 7 illustrates embodiments in which a pre-cured GPE layer is adhered to a solidified anode slurry and a pre-cured GPE layer is adhered to a solidified cathode slurry prior to adjoining the pre-fabricated anode and pre-fabricated cathode, certain embodiments of the invention may comprise utilization of only one pre-fabricated electrode (e.g. anode or cathode) including a pre-cured GPE layer. In accordance with certain embodiments of the invention, for example, a GPE-composition may be cured or provided as a pre-cured layer on top of an anode and top-coated with a cathode to form an electrochemical cell in a continuous, semi-continuous, or batch process. In accordance with certain embodiments of the invention, a GPE-composition may be cured or provided as a pre-cured layer on top of a cathode and top-coated with an anode to form an electrochemical cell in a continuous, semi-continuous, or batch process.

EXAMPLES

The present disclosure is further illustrated by the following examples, which in no way should be construed as being limiting. That is, the specific features described in the following examples are merely illustrative and not limiting.

A: Preparation of Highly Concentrated Electrolytes

Preparation of highly concentrated electrolyte 1: The electrolyte solution was prepared by dissolving 49.7 g of lithium bis(trifluoromethanesulfonyl)imide (LiTFSI) and 9.0 g of lithium trifluoromethanesulfonate (LiOTf) in 8.24 g distilled water.

Preparation of highly concentrated electrolyte 2: The electrolyte solution was prepared by dissolving 49.7 g of lithium bis(trifluoromethanesulfonyl)imide (LiTFSI) in 8.24 g deionized water.

Preparation of the electrolyte 3: The electrolyte solution was prepared by dissolving 14.55 g of zinc bis(trifluoromethane sulfonate) [$Zn(OTf)_2$] in 10.0 g of deionized water.

Preparation of electrolyte 4: The electrolyte solution was prepared by dissolving 42.6 g of lithium bis(trifluoromethanesulfonyl)imide (LiTFSI) and 15.47 g of zinc di[bis(trifluoromethane sulfonyl)imide] [$Zn(TFSI)_2$] in 8.24 g of deionized water.

Preparation of electrolyte 5: The electrolyte solution was prepared by dissolving 47.3 g of lithium bis(trifluoromethanesulfonyl)imide (LiTFSI) and 5.15 g of zinc di[bis(trifluoromethane sulfonyl)imide] [$Zn(TFSI)_2$] in 8.24 g of deionized water.

B: Preparation of Gel Polymer Electrolytes (GPEs)

General Procedure 1: General procedure for the preparation of the gel polymer electrolytes (GPEs): The selected monomers and photo-initiator were weighed into a 20 mL screw-capped amber vial and mixed using a vortex mixer until a homogeneous solution was formed. A portion of the resulting monomer/initiator mixture was weighed into a separate 20 mL screw-capped amber vial. A portion of the desired electrolyte solution was added to achieve the desired ratio of monomer, lithium salt, and water. The resulting mixture was mixed using a vortex mixer until a homogeneous solution was formed. After mixing, the solution was allowed to rest for several minutes to allow any entrained air bubbles to escape the solution. At that time, an aliquot of the solution was pipetted onto a non-stick substrate (either HDPE or PP plastic sheet, or fluoropolymer-coated glass). Spacers (e.g. o-ring, washers, glass cover slips) were placed on the substrate, around the liquid. The liquid and spacers were then covered with a second UV-transparent substrate, which caused the liquid to spread to the same thickness as the spacers. The entire assembly was then transferred into the curing chamber of a UV lamp (Uvitron International Intelliray 600 lamp) and irradiated with UVA light at an intensity of 230 mW/cm2 for 10-30 seconds. The assembly was then removed from the lamp and carefully disassembled to reveal the fully cured, free-standing GPE.

Example 1

A monomer/initiator mixture was prepared according to General Procedure 1 by combining 4.66 g of triethylene glycol divinyl ether, 3.36 g of 2,2-(ethylenedioxy) diethanethiol, 1.22 g of trimethylolpropane tris(3-mercaptopropionate), and 0.080 g of 2,2-dimethoxy-2-acetophenone. 1.2 g of resulting solution was then combined with 2.8 g of highly concentrated electrolyte 1. Following the sample preparation and irradiation described in the General Procedure 1, a free-standing GPE containing 30 wt % polymer was produced.

Example 2

0.75 g of the monomer/initiator mixture described in Example 1 was combined with 4.25 g of highly concentrated electrolyte 1. Following the sample preparation and irradiation described in General Procedure 1, a free-standing GPE containing 15 wt % polymer was produced.

Example 3

A monomer/initiator mixture was prepared according to General Procedure 1 by combining 5.0 g of poly(ethylene glycol) diacrylate (average Mn=700), and 0.025 g of 2,2-dimethoxy-2-phenylacetophenone. 0.75 g of the resulting solution was combined with 4.25 g of highly concentrated electrolyte 1. Following the sample preparation and irradiation described in General Procedure 1, a free-standing GPE containing 15 wt % polymer was produced.

Example 4

A monomer/initiator mixture was prepared according to General Procedure 1 by combining 4.95 g of 2-hydroxyethyl acrylate, 0.05 g of poly(ethylene glycol) diacrylate (average Mn=700), and 0.025 g of 2,2-dimethoxy-2-phenylacetophenone. 0.75 g of the resulting solution was combined with 4.25 g of highly concentrated electrolyte 1. Following the sample preparation and irradiation described in General Procedure 1, a free-standing GPE containing 15 wt % polymer was produced.

Example 5

A monomer/initiator mixture was prepared according to General Procedure 1 by combining 4.95 g of 2-hydroxyethyl acrylate, 0.05 g of poly(ethylene glycol) diacrylate (average Mn=700), and 0.025 g of 2,2-dimethoxy-2-phenylacetophenone. 1.75 g of the resulting solution was combined with 3.25 g of highly concentrated electrolyte 1. Following the sample preparation and irradiation described in General Procedure 1, a free-standing GPE containing 35 wt % polymer was produced.

Example 6

A monomer/initiator mixture was prepared according to General Procedure 1 by combining 4.95 g of 2-hydroxyethyl acrylate, 0.05 g of poly(ethylene glycol) diacrylate (average Mn=700), and 0.025 g of 2,2-dimethoxy-2-phenylacetophenone. 1.25 g of the resulting solution was combined with 3.75 g of highly concentrated electrolyte 2. Following the sample preparation and irradiation described in General Procedure 1, a free-standing GPE containing 25 wt % polymer was produced.

Example 7

A monomer/initiator mixture was prepared according to General Procedure 1 by combining 4.75 g of poly(ethylene glycol) methyl ether acrylate (Mn=480), 0.25 g of poly (ethylene glycol) diacrylate (average Mn=700), and 0.025 g of 2,2-dimethoxy-2-phenylacetophenone. 1.25 g of the resulting solution was combined with 3.75 g of highly concentrated electrolyte 2. Following the sample preparation and irradiation described in General Procedure 1, a free-standing GPE containing 25 wt % polymer was produced.

Example 8

A monomer/initiator mixture was prepared according to General Procedure 1 by combining 2.40 g of 2-hydroxyethyl acrylate, 2.40 g of poly(ethylene glycol) methyl ether acrylate (Mn=480), 0.20 g of poly(ethylene glycol) diacrylate (average Mn=700), and 0.025 g of 2,2-dimethoxy-2-phenylacetophenone. 1.25 g of the resulting solution was combined with 3.75 g of highly concentrated electrolyte 2. Following the sample preparation and irradiation described in General Procedure 1, a free-standing GPE containing 25 wt % polymer was produced.

Example 9

A monomer/initiator mixture was prepared according to General Procedure 1 by combining 2.475 g of 2-hydroxyethyl acrylate, 2.475 g of poly(ethylene glycol) methyl ether acrylate (Mn=480), 0.05 g of poly(ethylene glycol) diacrylate (average Mn=700), and 0.025 g of 2,2-dimethoxy-2-phenylacetophenone. 1.5 g of the resulting solution was combined with 3.5 g of highly concentrated electrolyte 1. Following the sample preparation and irradiation described in General Procedure 1, a free-standing GPE containing 30 wt % polymer was produced.

Example 10

A monomer/initiator mixture was prepared according to General Procedure 1 by combining 4.75 g of 2-hydroxyethyl acrylate, 0.25 g of trimethylolpropane ethoxylate (1PO/OH) methyl ether di(meth)acrylate (average Mn=912), and 0.025 g of 2,2-dimethoxy-2-phenylacetophenone. 0.5 g of the resulting solution was combined with 1.5 g of highly concentrated electrolyte 1. Following the sample preparation and irradiation described in General Procedure 1, a free-standing GPE containing 25 wt % polymer was produced.

Example 11

The GPE solution described in Example 10 was drop cast on fluoropolymer-coated glass and cured directly by irradiation for 30 seconds without the addition of spacers or a top substrate to produce a free-standing GPE containing 25% polymer.

Example 12

A monomer/initiator mixture was prepared according to General Procedure 1 by combining 4.95 g of 2-hydroxyethyl acrylate, 0.05 g of poly(ethylene glycol) diacrylate (average Mn=700), and 0.025 g of 2,2-dimethoxy-2-phenylacetophenone. 1.0 g of the resulting solution was combined with 4.0 g of highly concentrated electrolyte 1. The resulting GPE solution was drop cast on fluoropolymer-coated glass and cured directly by irradiation for 30 seconds without the addition of spacers or a top substrate to produce a free-standing GPE containing 20% polymer.

Example 13

A monomer/initiator mixture was prepared according to General Procedure 1 by combining 4.66 g of triethylene glycol divinyl ether, 3.36 g of 2,2-(ethylenedioxy) diethanethiol, 1.22 g of trimethylolpropane tris(3-mercaptopropionate), and 0.080 g of 2,2-dimethoxy-2-acetophenone. 1.0 g of resulting solution was then combined with 3.0 g of highly concentrated electrolyte 1. The resulting GPE solution was drop cast on fluoropolymer-coated glass and cured directly by irradiation for 15 seconds without the addition of spacers or a top substrate to produce a free-standing GPE containing 25% polymer.

Example 14

Figure 8:
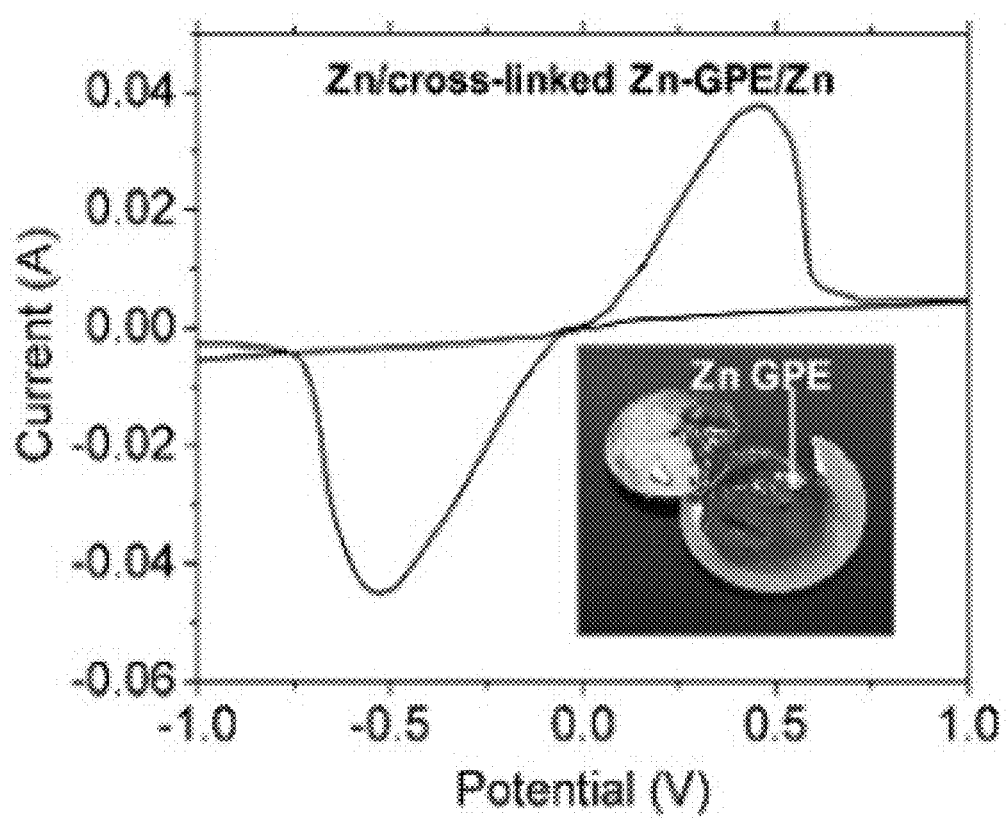
FIG. 8 illustrates the cyclic voltammetry scan, which shows reversible Zn stripping/plating, according to one example.

A monomer/initiator mixture was prepared according to General Procedure 1 by combining 4.75 g of 2-hydroxyethyl acrylate, 0.25 g of poly(ethylene glycol) diacrylate (average Mn=700), and 0.025 g of 2,2-dimethoxy-2-phenylacetophenone. 1.25 g of the resulting solution was combined with 3.75 g of highly concentrated electrolyte 3. Following the sample preparation and irradiation described in General Procedure 1, a free-standing GPE containing 25 wt % polymer was produced. The resulting GPE was positioned between zinc foils that were then positioned between stainless steel disks. The stack was the scanned from −1.5V to +1.5V, by cyclic voltammetry, using a Gamry Reference 3000 Tool. FIG. 8 illustrates the cyclic voltammetry scan, which shows reversible Zn stripping/plating.

Example 15

A monomer/initiator mixture was prepared according to General Procedure 1 by combining 4.75 g of 2-hydroxyethyl acrylate, 0.25 g of poly(ethylene glycol) diacrylate (average Mn=700), and 0.025 g of 2,2-dimethoxy-2-phenylacetophenone. 1.50 g of the resulting solution was combined with 3.50 g of highly concentrated electrolyte 4. Following the sample preparation, except that the GPE was cured directly on the zinc foil anode, and irradiation described in General Procedure 1, a free-standing GPE containing 30 wt % polymer was produced.

Example 16

A monomer/initiator mixture was prepared according to General Procedure 1 by combining 2.475 g of 2-hydroxyethyl acrylate, 2.475 g of poly(ethylene glycol) methyl ether acrylate (Mn=480), 0.05 g of poly(ethylene glycol) diacrylate (average Mn=700), and 0.025 g of 2,2-dimethoxy-2-phenylacetophenone. 1.5 g of the resulting solution was combined with 3.5 g of highly concentrated electrolyte 5. Following the sample preparation and irradiation described in General Procedure 1, a free-standing GPE containing 30 wt % polymer was produced.

C: Fabrication and Testing of Aqueous Polymer Li-Ion Electrochemical Cells With Cross-Linked GPEs.

General Procedure 2: General preparation of electrochemical cells (batteries) based on aqueous GPEs: Following the preparation of the free-standing GPEs, as exemplified in the Examples, the resulting films were removed from the substrate, and transferred to a plastic cutting board. A disk (16 mm) of the GPE film was then punched out using a punch. The tacky disk was then carefully placed between pre-cut disks (14 mm) of aluminum foil, coated with cathode electrode of containing lithium manganese dioxide (LMO—Nanomyte BE-30E, standard) and anode electrode containing lithium titanium oxide (LTO—Nanomyte BE-30E, standard). The resulting anode/GPE/cathode stack was then placed between two stainless steel current collectors, topped with a compression spring, loaded into a CR2032 coin cell, which was then crimped closed at a 1000 psi of pressure for at least 10 seconds. The battery was then tested on Landt Instruments High Precision Battery Testing System, Model 2001A. The cell was cycled from 1 to 2.6V at a current of 50 to 100 microamps.

Example 17

Figure 9A:
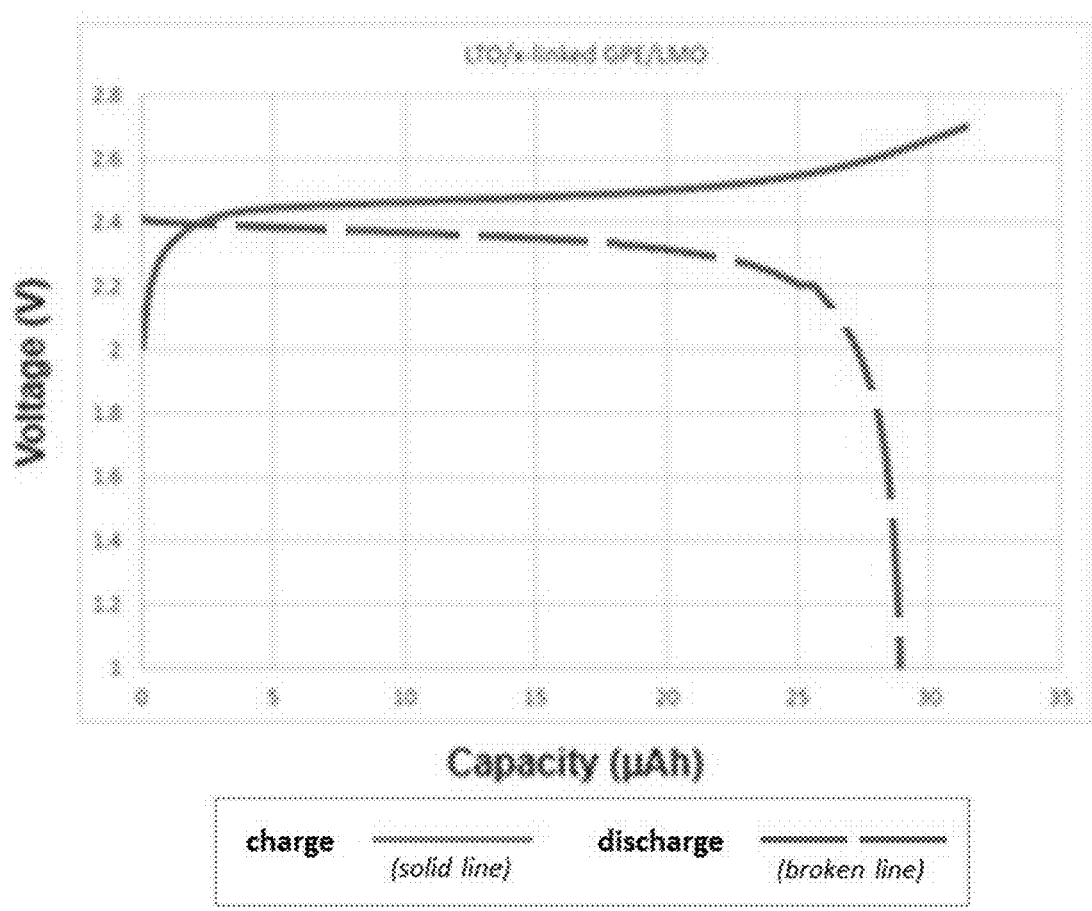
Figure 9B:
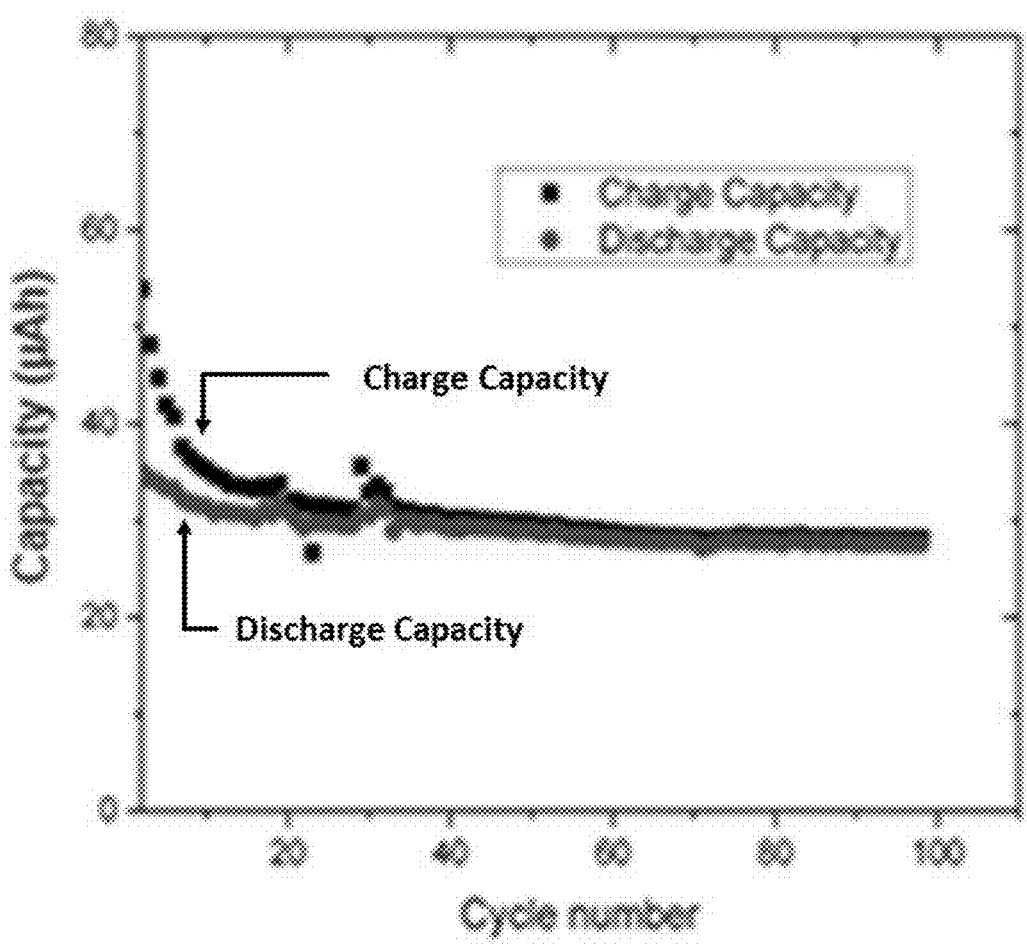
Figure 10:
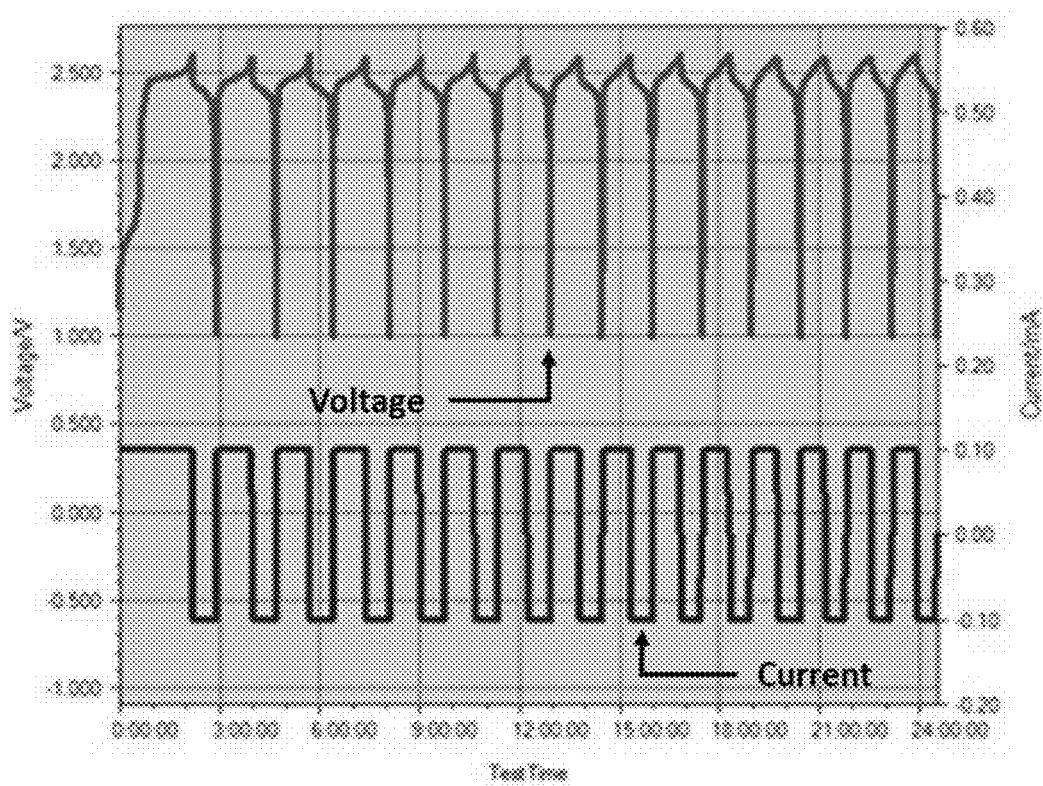
FIG. 10 shows battery cycling (e.g., first 15 cycles) for an example electrochemical cell.

An electrochemical cell was prepared according to General Procedure 2 using the GPE described in Example 5, except that it contained 30 wt % polymer. FIGS. 7A and 7B show that the electrochemical cell exhibited extended cycling. FIG. 9A shows the $63^{rd}$ cycle and FIG. 9B shows the capacity vs. cycle life. FIG. 10 shows battery cycling (e.g., first 15 cycles) tested at 100 microamps from 1 to 2.6V CR2032 coin cell, LMO (Nanomyte-BE-30E, standard, 7.76 mg), LTO (Nanomyte-BE-10E, standard, 3.98 mg).

Example 18

Figure 11:
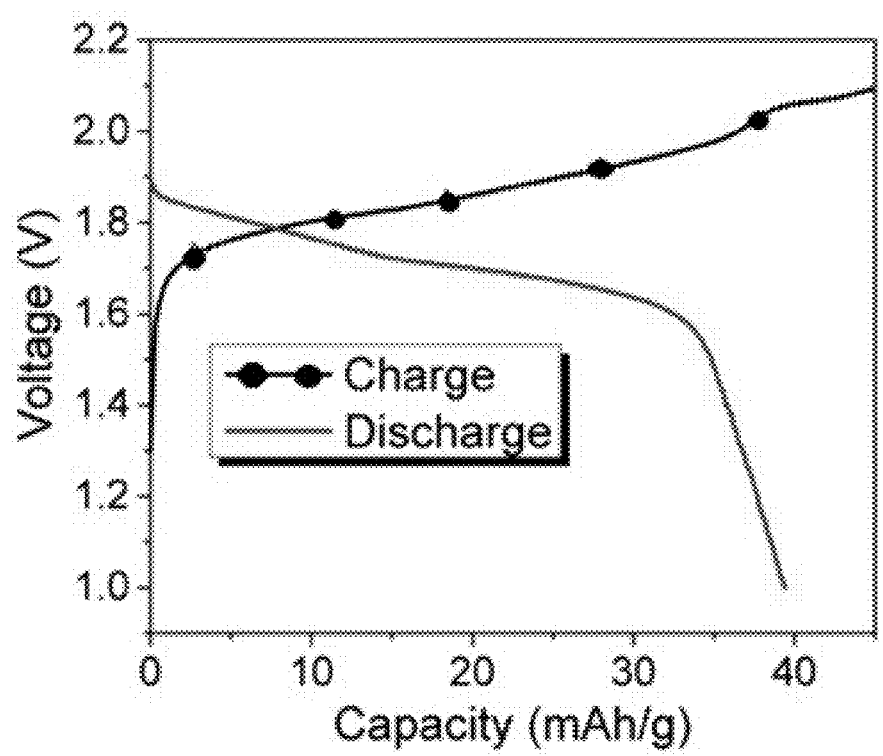
FIG. 11 shows that an example electrochemical cell exhibited extended cycling.

An electrochemical cell was prepared according to General Procedure 2 using the GPE described in Example 15, except that a zinc foil anode was used instead of LTO. FIG. 11 shows that the electrochemical cell exhibited extended cycling.

Example 19

Figure 13A:
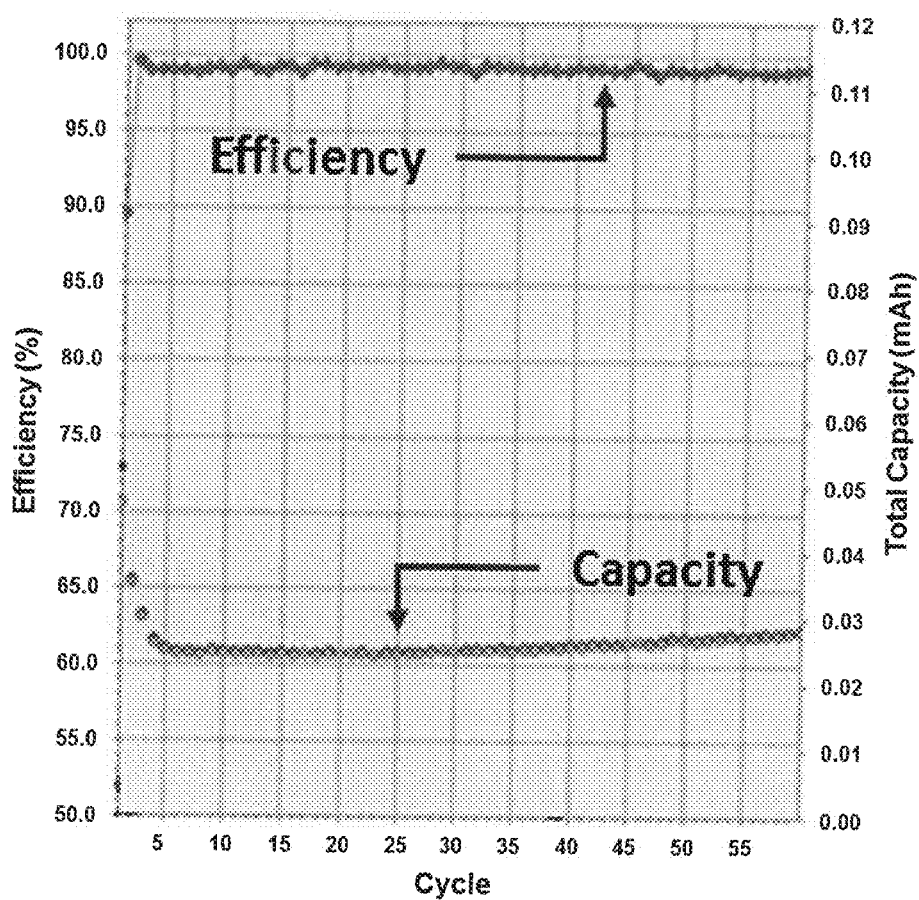
FIGS. 13A and 13B show (i) the efficiency vs. cycle curve, and (ii) the current-voltage curve, respectively, for an example electrochemical cell.
Figure 13B:
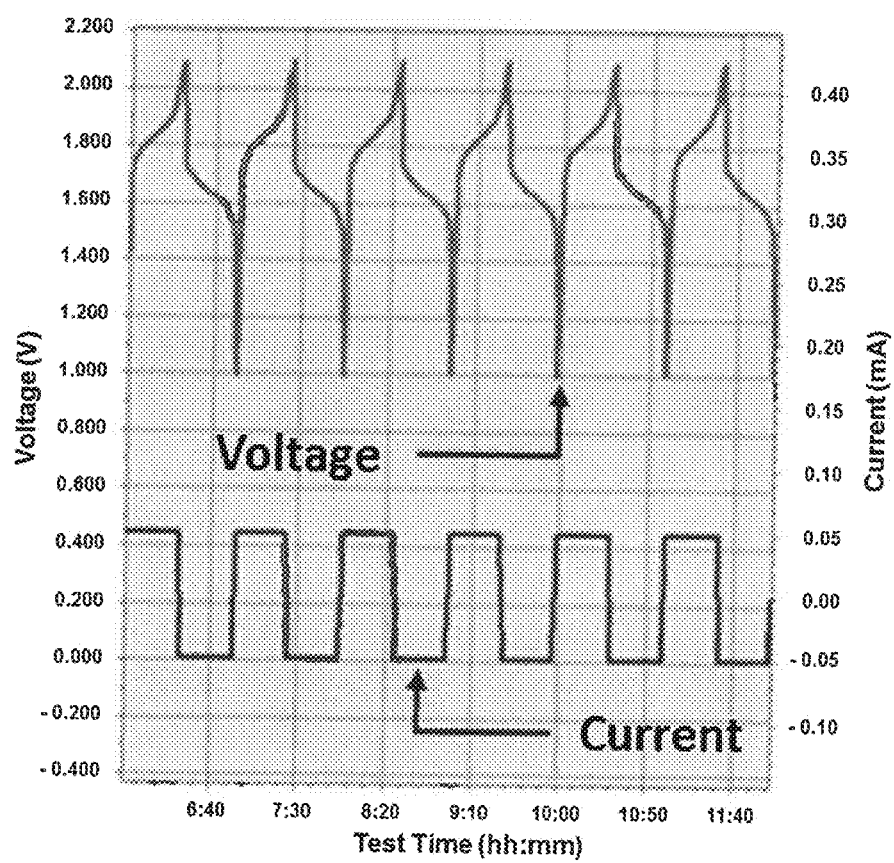

An electrochemical cell was prepared according to General Procedure 2 using the GPE described in Example 16, except that a zinc foil anode was used instead of LTO. FIG. 13A shows the efficiency vs. cycle curve, and FIG. 13B shows the current-voltage curve for the electrochemical cell.

Example 20

Figure 12:
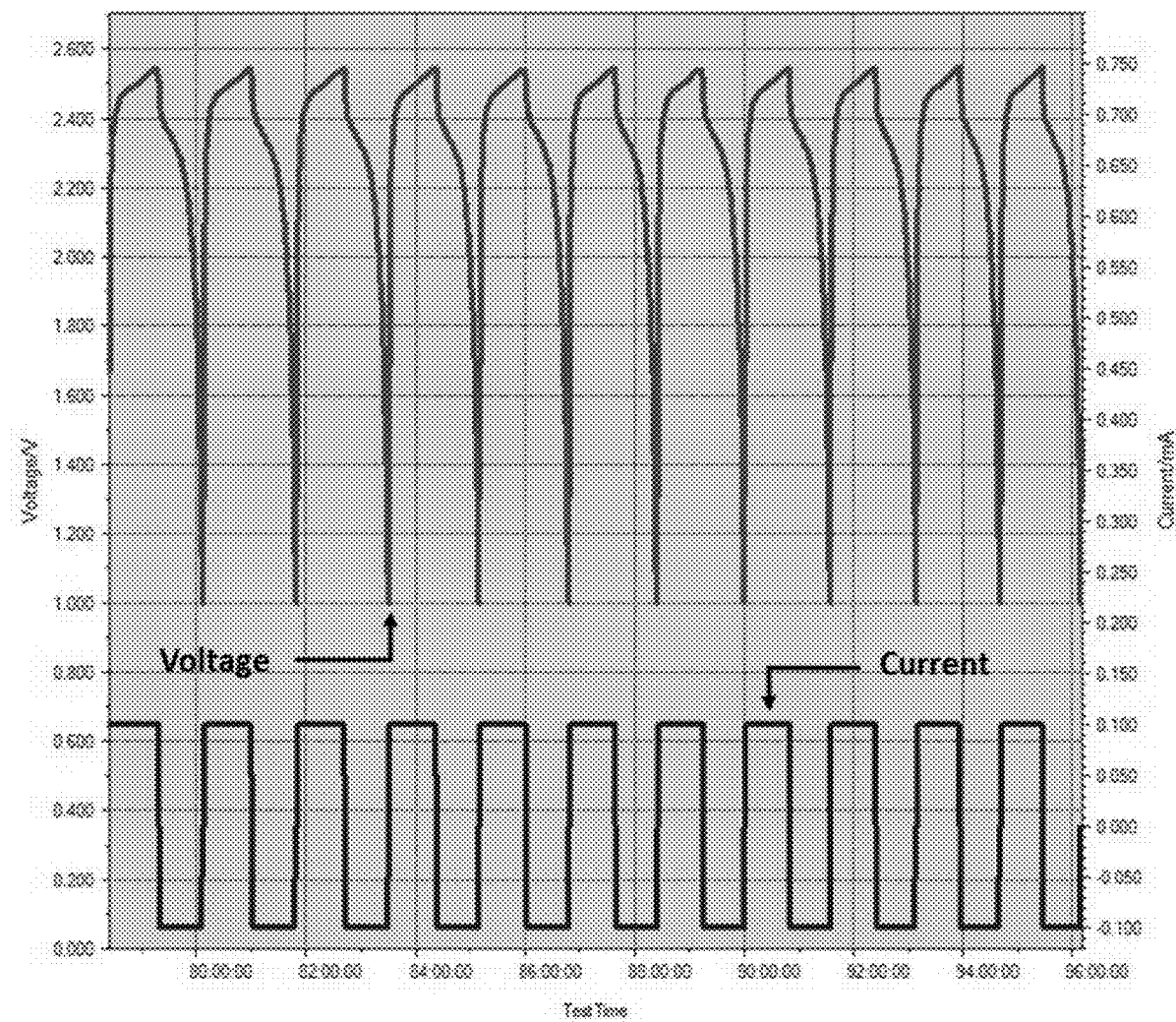
FIG. 12 shows a current-voltage curve for several cycles of an example electrochemical cell.

An electrochemical cell was prepared according to General Procedure 2 using the GPE described in Example 1. FIG. 12 shows a current-voltage curve for cycles 30-40 of the electrochemical cell.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A gel polymer electrolyte (GPE) composition, comprising:
   (i) a cross-linked three-dimensional polymer network comprising the reaction product of at least (i) a first monomer including at least three thiol functional groups; (ii) a second monomer including at least two vinyl functional groups, at least one alkyne functional group, or a combination thereof, and (iii) a third monomer including at least two thiol functional groups, wherein the first monomer and the third monomer are different; and
   (ii) an aqueous-based electrolyte composition comprising an electrolyte and water, wherein the GPE composition comprises less than 10% by weight of an organic solvent.

2. The GPE composition of claim 1, wherein each of the first monomer, the second monomer, and the third monomer are substantially water soluble.

3. The GPE composition of claim 1, wherein the GPE composition is provided in the form of a water-swellable hydrogel having a thickness from about 10 to 500 microns.

4. The GPE composition of claim 1, wherein the cross-linked three-dimensional polymer network comprises from about 10% to about 75% by weight of the GPE composition.

5. The GPE composition of claim 1, wherein the electrolyte comprises a salt selected from a lithium salt or a zinc salt, or combination thereof.

6. The GPE composition of claim 5, wherein the salt comprises lithium bis(trifluoromethanesulfonyl)imide (LiTFSI), lithium trifluoromethanesulfonate (LiOTf), lithium chloride (LiCl), lithium hexafluorophosphate ($LiPF_6$), a lithium polysulfide, lithium perchlorate ($LiClO_4$), lithium bromide (LiBr), lithium iodide (LiI), lithium thiocyanate (LiSCN), lithium tetrafluoroborate (LiBF4), lithium hexafluoroarsenate (LiAsF6), lithium bis(oxalate)borate, zinc trifluoromethanesulfonate ($Zn(OTf)_2$), or zinc di[bis(trifluoromethanesulfonyl)imide)] $Zn(TFSI)_2$ and mixtures thereof.

7. The GPE composition of claim 1, wherein the GPE composition is devoid of an organic solvent.

8. An electrochemical cell, comprising:
   (i) an anode;
   (ii) a cathode;
   (iii) a gel polymer electrolyte (GPE) positioned between and in contact with the anode and the cathode; wherein the GPE includes a GPE-composition comprising (a) a cross-linked three-dimensional polymer network and (b) an aqueous-based electrolyte composition absorbed by the GPE, in which the electrolyte composition comprises an electrolyte and water, and wherein the GPE-composition comprises less than 10% by weight of an organic solvent.
   wherein the cross-linked three-dimensional polymer network comprises the reaction product of at least (i) a first monomer including at least three thiol functional groups; (ii) a second monomer including at least two vinyl functional groups, at least one alkyne functional group, or a combination thereof, and (iii) a third monomer including at least two thiol functional groups, wherein the first monomer and the third monomer are different.

9. The electrochemical cell of claim 8, wherein
   (i) the anode comprises an anode-composition comprising (a) an active anode species and (b) the GPE-composition; wherein the active anode species and the GPE-composition are admixed together; or
   (ii) the cathode comprises a cathode-composition comprising (a) an active cathode species and (b) the GPE-composition; wherein the active cathode species and the GPE-composition are admixed together; or
   (iii) the combination of (i) and (ii).

10. The electrochemical cell of claim 8, wherein the GPE-composition is devoid of an organic solvent.

11. A method of forming a gel polymer electrolyte (GPE), comprising radically-curing an aqueous composition of a mixture of monomers in an oxygen-containing environment; wherein the mixture of monomers comprise a first group of monomers comprising at least (a) a first monomer including at least three thiol functional groups, (b) a second monomer including at least two vinyl functional groups, at least one alkyne functional group, or a combination thereof, and (c) a third monomer including at least two thiol functional groups, wherein the first monomer and the third monomer are different.

12. The method of claim 11, further comprising a step of mixing the first group of monomers with an electrolyte in water to provide the aqueous composition, and depositing a coating of aqueous composition onto a substrate prior to radically-curing the aqueous composition.

13. A method of forming an electrochemical cell, comprising:
   depositing a gel polymer electrolyte (GPE) between and in contact with an anode and a cathode; wherein depositing the GPE comprises positioning a pre-fabricated GPE between the anode and the cathode or forming the GPE directly onto the anode or the cathode, and wherein the GPE includes a GPE-composition comprising (a) a cross-linked three-dimensional polymer network comprising the reaction product of at least (i) a first monomer including at least three thiol functional groups; (ii) a second monomer including at least two vinyl functional groups, at least one alkyne functional group, or a combination thereof, and (iii) a third monomer including at least two thiol functional groups, wherein the first monomer and the third monomer are different, and (b) an aqueous-based electrolyte composition absorbed by the GPE, in which the electrolyte composition comprises an electrolyte and water, and wherein the GPE-composition comprises less than 10% by weight of an organic solvent.

14. The method of claim 13, wherein the depositing the GPE comprises forming a first GPE-layer directly onto the anode and forming a second GPE-layer directly onto the cathode, and further comprising a step of joining the first GPE-layer and the second GPE-layer together such that the first GPE-layer and the second GPE-layer are located between the anode and the cathode.

15. The method of claim 13, wherein depositing the GPE comprises forming the GPE directly onto the anode or the cathode, and wherein forming the GPE directly onto the anode or the cathode comprises radically-curing an aqueous composition of a mixture of monomers in an oxygen-containing environment; wherein the mixture of monomers comprises a first group of monomers comprising at least the first monomer, the second monomer, and the third monomer.

* * * * *